US008456868B2

United States Patent
He et al.

(10) Patent No.: US 8,456,868 B2
(45) Date of Patent: Jun. 4, 2013

(54) CONTROLLER FOR A RESONANT SWITCHED-MODE POWER CONVERTER

(75) Inventors: Yi He, Singapore (SG); Tuck Meng Chan, Singapore (SG); Yong Siang Teo, Singapore (SG); Xiaowu Gong, Singapore (SG); Meng Kiat Jeoh, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 386 days.

(21) Appl. No.: 12/771,467

(22) Filed: Apr. 30, 2010

(65) Prior Publication Data
US 2011/0267844 A1 Nov. 3, 2011

(51) Int. Cl.
*H02M 3/335* (2006.01)
(52) U.S. Cl.
USPC ............................................. 363/20; 323/286
(58) Field of Classification Search
USPC .................... 363/16–20, 21.06, 21.07, 21.12, 363/21.16, 56.01, 95, 97, 98, 132, 131; 315/291, 315/307; 323/282–288
See application file for complete search history.

(56) References Cited

U.S. PATENT DOCUMENTS

| | | | | |
|---|---|---|---|---|
| 5,965,989 A * | 10/1999 | Mader | ........................... | 315/279 |
| 6,377,480 B1 * | 4/2002 | Sase et al. | ....................... | 363/49 |
| 6,961,253 B1 * | 11/2005 | Cohen | ............................. | 363/89 |
| 7,095,629 B2 * | 8/2006 | Yasumura | ....................... | 363/16 |
| 7,193,866 B1 * | 3/2007 | Huang et al. | ..................... | 363/22 |
| 7,218,534 B2 * | 5/2007 | Yasumura | .................. | 363/21.06 |
| 7,564,702 B2 * | 7/2009 | Schlecht | ................... | 363/21.06 |
| 7,706,156 B2 * | 4/2010 | Hsieh et al. | ................ | 363/21.02 |
| 7,911,812 B2 * | 3/2011 | Colbeck et al. | ............ | 363/21.02 |
| 2007/0008757 A1 | 1/2007 | Usui et al. | | |
| 2007/0263421 A1 | 11/2007 | Kyono | | |
| 2010/0103710 A1 | 4/2010 | Reddy | | |
| 2010/0290256 A1 | 11/2010 | Zhou et al. | | |

* cited by examiner

*Primary Examiner* — Rajnikant Patel
(74) *Attorney, Agent, or Firm* — Slater & Matsil, L.L.P.

(57) ABSTRACT

An embodiment of the invention relates to an LLC power converter including a controller configured to regulate an output characteristic of the power converter by controlling a power converter switching frequency. In a first mode of operation, the controller turns off a secondary-side power switch earlier than a turn-off time of a primary-side power switch by a time difference that is controlled by a resistor coupled to an external circuit node. In a second mode of operation, the controller turns on a secondary-side power switch at substantially the same time as the primary-side power switch, and turns off the secondary-side power switch after a maximum on time that is a nonlinear function of a load current of the power converter. The nonlinear function is a substantially constant function of the load current for a value of the load current higher than a threshold value.

25 Claims, 18 Drawing Sheets

CONTROLLER FOR A RESONANT SWITCHED-MODE POWER CONVERTER

TECHNICAL FIELD

An embodiment of the invention relates generally to electronic power conversion and methods, and more particularly to the use of a controller for a primary-side and a secondary-side power switch in a resonant switched-mode power converter.

BACKGROUND

A switched-mode power converter (also referred to as a "power converter" or "regulator") is a power supply or power processing circuit that converts an input voltage waveform into a specified output voltage waveform. DC-DC power converters convert a dc input voltage which may be time varying into a dc output voltage. Controllers associated with the power converters manage an operation thereof by controlling conduction periods or switching frequencies of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of power switches of a hard-switched power converter or a switching frequency of the power switches of a resonant power converter. The duty cycle is a ratio represented by a conduction period of a power switch to a switching period thereof. Thus, if a switch conducts for half of the switching period, the duty cycle for the power switch would be 0.5 (or 50%). Additionally, as voltage or current for systems, such as a microprocessor powered by the power converter, dynamically change (e.g., as a computational load on a load microprocessor changes), the controller should be configured to dynamically increase or decrease the duty cycle or the switching frequency of the power switches therein to maintain an output characteristic, such as an output voltage, at a desired value. A controller for a power converter is generally formed as an integrated circuit with conductive pins that are soldered or otherwise electrically bonded to a printed wiring board in an end product.

To provide the voltage conversion and regulation functions, the power converters include active power switches such as metal-oxide semiconductor field-effect transistors ("MOSFETs") that are coupled to the input voltage source and periodically switch a reactive circuit element such as an inductor to the voltage source at a switching frequency that may be on the order of 100 kHz or higher. To provide a dc output voltage, the power converters include diodes to provide a rectification function. When high power conversion efficiency is desired, synchronous rectifiers are substituted for the rectifying diodes. A controller in the power converter is frequently employed to produce a control signal for a synchronous rectifier.

A design issue for resonant power converters is the need to provide suitable timing for the control signal that controls a synchronous rectifier on the secondary side of the power train relative to the timing of a control signal that controls a primary-side power switch therein. The timing of the signal that controls the synchronous rectifier relative to the timing of the control signal for a primary-side power switch can have a substantial impact on power conversion efficiency. In view of the present market focus on producing power converters with high power conversion efficiency at high manufacturing volume and with low manufacturing cost, an improved process and method to provide such timing control in a resonant power converter would address an unanswered market need.

Thus, there is a need for a process and related method to provide improved control of timing of a control signal for a secondary-side synchronous rectifier in a resonant switched-mode power converter that avoids the disadvantages of conventional approaches.

SUMMARY OF THE INVENTION

In accordance with an exemplary embodiment, an inductor-inductor-capacitor ("LLC") power converter and a related method are provided. In an embodiment, the LLC power converter includes a controller configured to regulate an output characteristic of the power converter by controlling a switching frequency of the power converter to be higher than a resonant frequency thereof. The LLC power converter includes a primary-side power switch, a secondary-side power switch, a power transformer including a first winding coupled to a switched terminal of the primary-side power switch, and a second winding coupled to a switched terminal of the secondary-side power switch, a capacitor coupled between the switched terminal of the primary-side power switch, and a terminal of the first winding of the power transformer. In an embodiment, the controller produces a first control signal to control the primary-side power switch and a second control signal to control the secondary-side power switch. The secondary-side power switch is turned off earlier than a turn-off time of the primary-side power switch by a time difference that is controlled by a resistor coupled to an external circuit node. The controller is further configured to turn on the secondary-side power switch after a turn-on time of the primary-side power switch by a substantially constant time difference.

In accordance with a further exemplary embodiment, an LLC power converter and a related method are provided. In an embodiment, the LLC power converter includes a controller configured to regulate an output characteristic of the power converter by controlling a switching frequency of the power converter at a frequency lower than a resonant frequency thereof. The LLC power converter includes a primary-side power switch, a secondary-side power switch, a power transformer including a first winding coupled to a switched terminal of the primary-side power switch and a second winding coupled to a switched terminal of the secondary-side power switch, a capacitor coupled between the switched terminal of the primary-side power switch and a terminal of the first winding of the power transformer. The controller produces a first control signal to control the primary-side power switch and a second control signal to control the secondary-side power switch so that the secondary-side power switch is turned on at substantially the same time as the primary-side power switch, and is turned off after a maximum on time that is a nonlinear function of the load current of the power converter. In an embodiment, the nonlinear function is a substantially constant function of the load current for a value of the load current higher than a threshold value.

In accordance with a further exemplary embodiment, an LLC power converter and a related method are provided. In an embodiment, the LLC power converter includes a controller configured to regulate an output characteristic of the power converter by controlling a switching frequency of the power converter in a first mode of operation at a frequency lower than a resonant frequency thereof, and in a second mode of operation at a frequency higher than the resonant frequency thereof. The LLC power converter includes a primary-side power switch, a secondary-side power switch, a power transformer including a first winding coupled to a switched terminal of the primary-side power switch and a second winding coupled to a switched terminal of the secondary-side power switch, a capacitor coupled between the switched terminal of the primary-side power switch and a terminal of the first winding of the power transformer.

In the first mode of operation, the controller produces a first control signal to control the primary-side power switch and a second control signal to control the secondary-side power switch. The secondary-side power switch is turned off earlier than a turn-off time of the primary-side power switch by a time difference that is controlled by a resistor coupled to an external circuit node. The controller is further configured to turn on the secondary-side power switch after a turn-on time of the primary-side power switch by a substantially constant time difference.

In the second mode of operation, the controller produces a first control signal to control the primary-side power switch and a second control signal to control the secondary-side power switch so that the secondary-side power switch is turned on at substantially the same time as the primary-side power switch, and is turned off after a maximum on time that is a nonlinear function of the load current of the power converter. In an embodiment, the nonlinear function is a substantially constant function of the load current for a value of the load current higher than a threshold value.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a resonant switched-mode power converter formed with a controller configured to provide a control signal for a secondary-side synchronous rectifier with suitable delay with respect to timing of a primary-side power switch.

An embodiment of the invention may be applied to various electronic power conversion devices, for example, to a half-bridge resonant power converter constructed with a controller configured to produce a control signal for secondary-side synchronous rectifier and to regulate a dc output voltage. Other electronic power conversion devices can be constructed that employ a controller to produce a control signal for the secondary-side synchronous rectifier as introduced herein in different contexts using inventive concepts described herein, for example, a power amplifier or a motor controller applied in an entertainment, communications, or industrial environment.

In applications of switch-mode power supplies, the resonant half-bridge circuit topology is a frequent choice of a circuit structure for high power applications.

Figure 1:
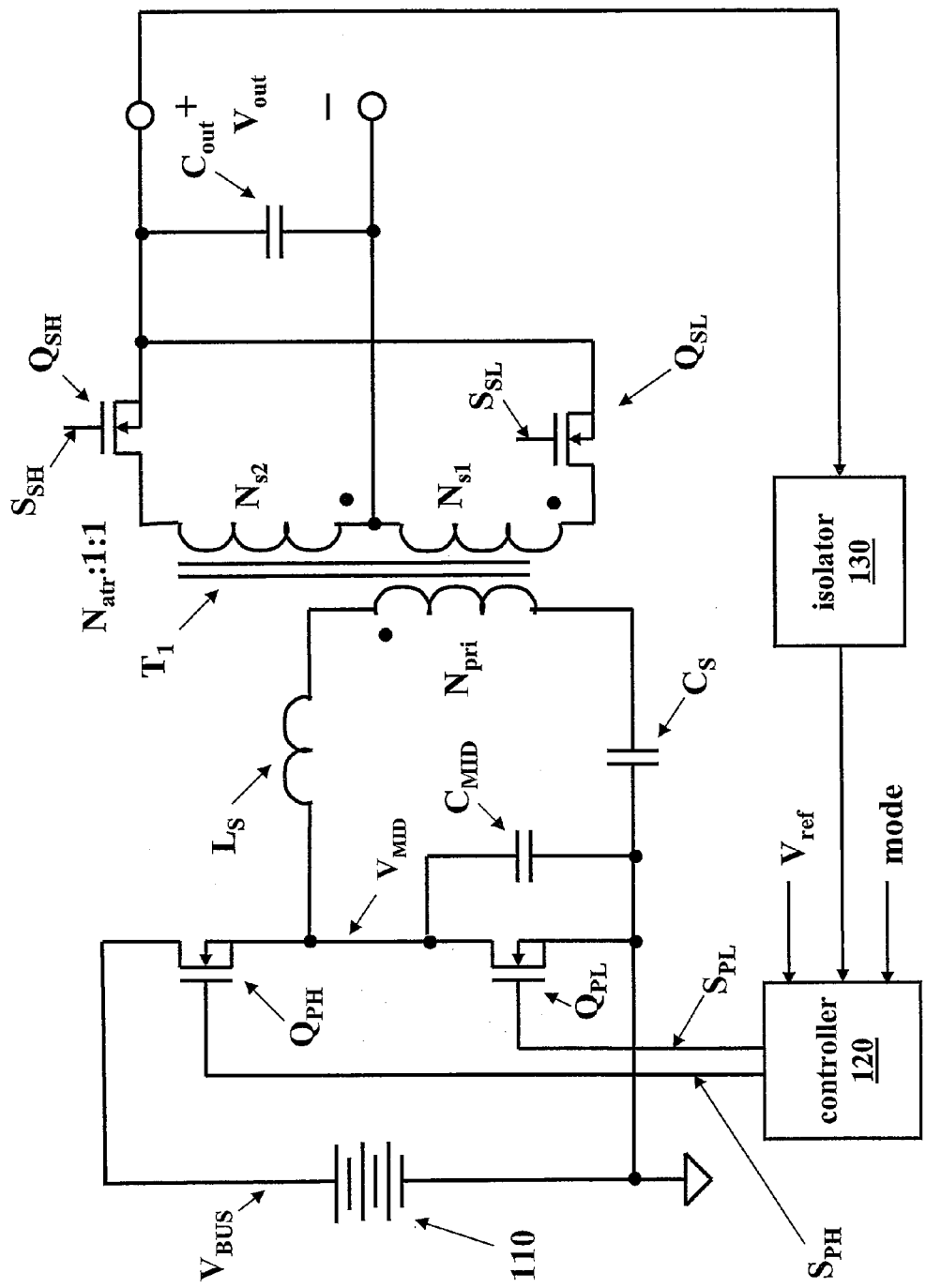
FIG. 1 illustrates a schematic drawing of a resonant half-bridge power converter to illustrate the operation thereof, constructed according to the principles of the invention.

Turning initially to FIG. 1, illustrated is a schematic drawing of an embodiment of a resonant half-bridge power converter to illustrate the operation thereof. This half-bridge topology is often referred to as an inductor-inductor-capacitor ("LLC") power train circuit topology wherein a duty cycle of each primary-side power switch is set to about 50%, and the switching frequency $f_s$ is varied to control an output characteristic such as an output voltage. In practice, the duty cycle of each primary-side power switch is set to slightly less than 50% to avoid current shoot-through during switching transitions.

The resonant half-bridge power converter is coupled to an input voltage source $V_{BUS}$ represented in FIG. 1 by battery 110. The power converter includes controller 120 that regulates a power converter output characteristic such as an output voltage by regulating a switching frequency $f_s$ of the power converter. The controller 120 of the power converter senses the output voltage $V_{out}$ of the power converter and a desired output voltage $V_{ref}$ and controls a switching frequency $f_s$ of the primary-side power switches to regulate the output voltage $V_{OUT}$ at the desired output voltage $V_{ref}$.

The power converter provides power to a system or load (not shown) coupled to the output $V_{out}$. While in the illustrated embodiment the power train employs a half-bridge resonant power converter topology, those skilled in the art should understand that other converter topologies such as an isolated resonant full-bridge power converter topology are well within the broad scope of the present invention.

The power converter further includes isolator 130 that is employed to transmit a sensed output characteristic across the isolation boundary provided by the power transformer $T_1$ to the controller 120. Various circuit devices such as an opto-isolator to provide this isolation function are well known in the art and will not be described further herein in the interest of brevity.

In the primary side of the circuit, two series-coupled power switches, MOSFETs $Q_{PH}$ and $Q_{PL}$, are coupled to two inductors, resonant inductor $L_S$ and the primary winding of the power transformer $T_1$, and to capacitor $C_S$. In the secondary side of the circuit, two synchronous rectifier power switches, MOSFETs $S_{SH}$ and $S_{SL}$, are employed in place of diodes to reduce power losses through the diodes that would result from a forward-conducted current therethrough. Body diodes of MOSFET switches will not be illustrated in this and following figures to provide simplicity of the graphical circuit representations.

The capacitor $C_{MID}$ represents circuit parasitic capacitance and any additional capacitance that may be connected to the indicated node between the primary-side power MOSFET switches $Q_{PH}$ and $Q_{PL}$.

The resonant frequency of the LLC power train circuit topology is $f_{RES}$, which refers to the frequency associated with the time of the start of secondary diode conduction to the time at which the gate of the associated primary-side power MOSFET switch is turned off. The resonant frequency $f_{RES}$ can be estimated from the equation $$f_{RES} = \pi \times \sqrt{L_S \times C_S}$$

where $L_S$ and $C_S$ are the inductance and capacitance respectively of the indicated primary-side power train circuit elements illustrated in FIG. 1.

Control of the secondary-side synchronous rectifier MOSFETs can be described as follows: Turn-on of a secondary-side synchronous rectifier MOSFET depends on the associated primary-side MOSFET gate voltage signal. When the circuit is operated at switching frequency $f_s$ that is higher than the resonant frequency $f_{RES}$, turning off the secondary-side synchronous rectifier MOSFET follows the associated primary-side gate voltage signal.

When the circuit is operated with switching frequency $f_s$ lower than the resonant frequency $f_{RES}$, turning off the associated secondary-side synchronous rectifier MOSFET generally uses a signal to turn off the secondary-side synchronous rectifier that is earlier than the associated primary-side MOSFET gate-drive signal. It is generally a design choice whether to operate the circuit with switching frequency $f_s$ higher or lower than the resonant frequency $f_{RES}$.

In an embodiment, the controller 120 is responsive to a signal "mode" that determines whether the controller operates with a switching frequency $f_s$ higher or lower than the resonant frequency $f_{RES}$. The signal mode can be implemented by selection of an input voltage to the controller, such as selection of a voltage substantially equal to a bias voltage, or by a jumper coupled between two terminals or other physical connection process known in the art.

Figure 2:
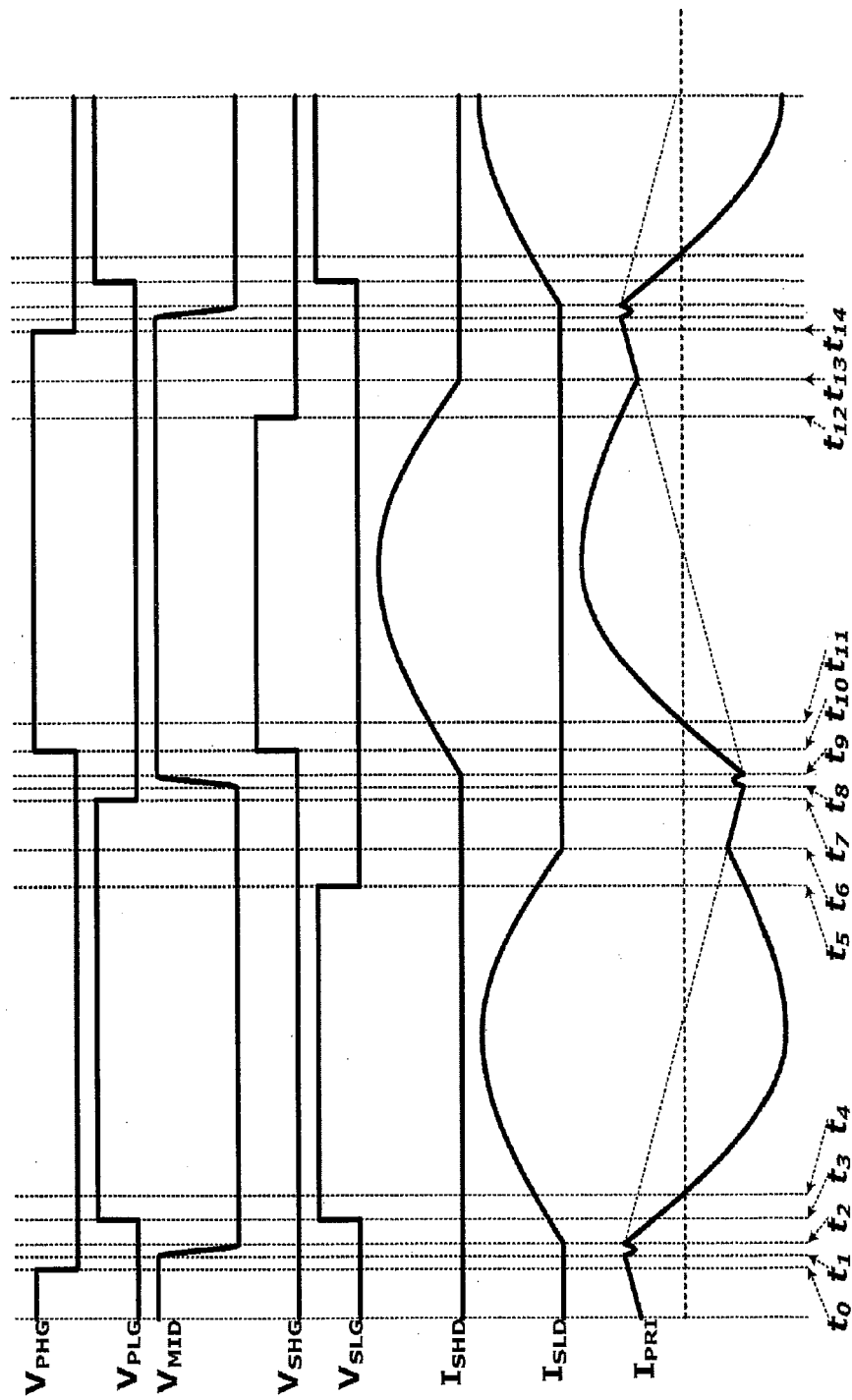
FIG. 2 illustrates a graphical representation of waveforms for an LLC power train topology constructed with synchronous rectifiers when the switching frequency is lower than resonant frequency, illustrating an embodiment.

Turning now to FIG. 2, illustrated is a graphical representation of waveforms for the LLC power train topology constructed with synchronous rectifiers when the switching frequency $f_s$ is lower than resonant frequency $f_{RES}$, illustrating an embodiment. In FIG. 2, the waveform $V_{PHG}$ represents primary high-side gate voltage of the power MOSFET switch $Q_{PH}$; the waveform $V_{PLG}$ represents primary low-side gate voltage of the power MOSFET switch $Q_{PL}$; the waveform $V_{MID}$ represents midpoint voltage of the circuit node illustrated in FIG. 1; the waveform $V_{SHG}$ represents secondary high-side gate voltage of the power MOSFET switch $Q_{SH}$; the waveform $V_{SLG}$ represents secondary low-side gate voltage of the power MOSFET switch $Q_{SL}$; the waveform $I_{SHD}$ represents current through the secondary high-side switch $Q_{SH}$; the waveform $I_{SLD}$ represents current through secondary low-side switch $Q_{SL}$; and the waveform $I_{PRI}$ represents current through the primary side of the power transformer $T_1$.

The circuit illustrated in FIG. 1 operates as follows when the switching frequency $f_s$ is lower than resonant frequency $f_{RES}$. At time $t_0$, the voltage $V_{PHG}$ is pulled down to 0 V. At time $t_1$, the mid-point voltage $V_{MID}$ starts to change. From time $t_0$ to $t_1$ is the turn-off delay for primary-side power MOSFET switch $Q_{PH}$. At time $t_1$, primary-side power MOSFET switch $Q_{PH}$ (the primary high-side power switch) is turned off, and the voltage $V_{MID}$ at the indicated circuit node starts to decrease. During this phase, the transition period is determined by the primary current $I_{PRI}$ that flows through the primary winding of the power transformer $T_1$, and the midpoint-to-ground capacitance $C_{MID}$ that represents parasitic and possibly added capacitance at the circuit node.

The current $I_{PRI}$ that flows through the primary side of the power transformer $T_1$ is transferred from power MOSFET switch $Q_{PH}$ to the body diode of power MOSFET switch $Q_{PL}$.

At time $t_2$, power MOSFET switches $Q_{SL}$ and $Q_{PL}$ conduct through their respective body diode. At time $t_3$, the voltages $V_{SLG}$ and $V_{PLG}$ are set high. The dead time between the two primary-side power MOSFET switches is from time $t_0$ to $t_3$.

Due to inherent turn-on delay of a secondary-side power MOSFET switch that may result from a gate-drive transformer and circuit parasitic capacitance, the secondary-side power MOSFET switch is turned on late if it is turned on at the same time as the primary-side power MOSFET switch when the switching frequency $f_s$ is lower than resonant frequency $f_{RES}$.

At time $t_4$, the current $I_{PRI}$ that flows through the primary winding of power transformer $T_1$ changes its direction. The primary-side power MOSFET switch should be turned on before this point.

The worst case for timing occurs at full load and low input voltage $V_{BUS}$. The maximum dead time between the two primary-side power MOSFET switches can be represented by the equation $$t_4 - t_0 + t_{PGOFF} - t_{PGON}$$

where $t_{PGOFF}$ is the primary-side gate turn-off delay, and $t_{PGON}$ is the primary-side gate turn on delay.

Time $t_4$ to $t_5$ is a resonant period; at time $t_5$, power MOSFET switch $Q_{SL}$ is turned off.

Setting the maximum on-time of the secondary-side power MOSFET switch should be less than the ideal limiting case. In this example, the maximum on time is given by $t_6-t_3$.

From time $t_5$ to $t_6$ the primary-side power MOSFET switch $Q_{PL}$ continues to be on, and the current $I_{SLD}$ resonates to zero at time $t_6$. The time interval $t_6-t_5$ is the delay for the secondary-side power MOSFET switch to be turned off. This delay includes possible delay for a gate-drive pulse transformer and associated circuit elements in a gate-drive circuit.

From time $t_6$ to $t_7$, a resonant effect operates between the series capacitor $C_S$ and inductor $L_s$ (including the effect of the magnetizing inductance of the power transformer $T_1$).

The power MOSFET switch $Q_{PL}$ is turned off at time $t_8$.

From the waveforms illustrated in FIG. 2, it can be seen that the maximum on time of a secondary-side rectifier is from time $t_3$ to $t_7$. Half the switching period starts from time $t_0$, and ends at time $t_7$. In this mode, the secondary-side power MOSFET switch is turned off before the associated primary-side power MOSFET switch is turned off. Accordingly, the primary-side gate signal cannot be employed to turn off the associated secondary-side synchronous rectifier. An improved arrangement would be to use a maximum on-time control method to turn off the associated secondary-side synchronous rectifier.

Figure 3:
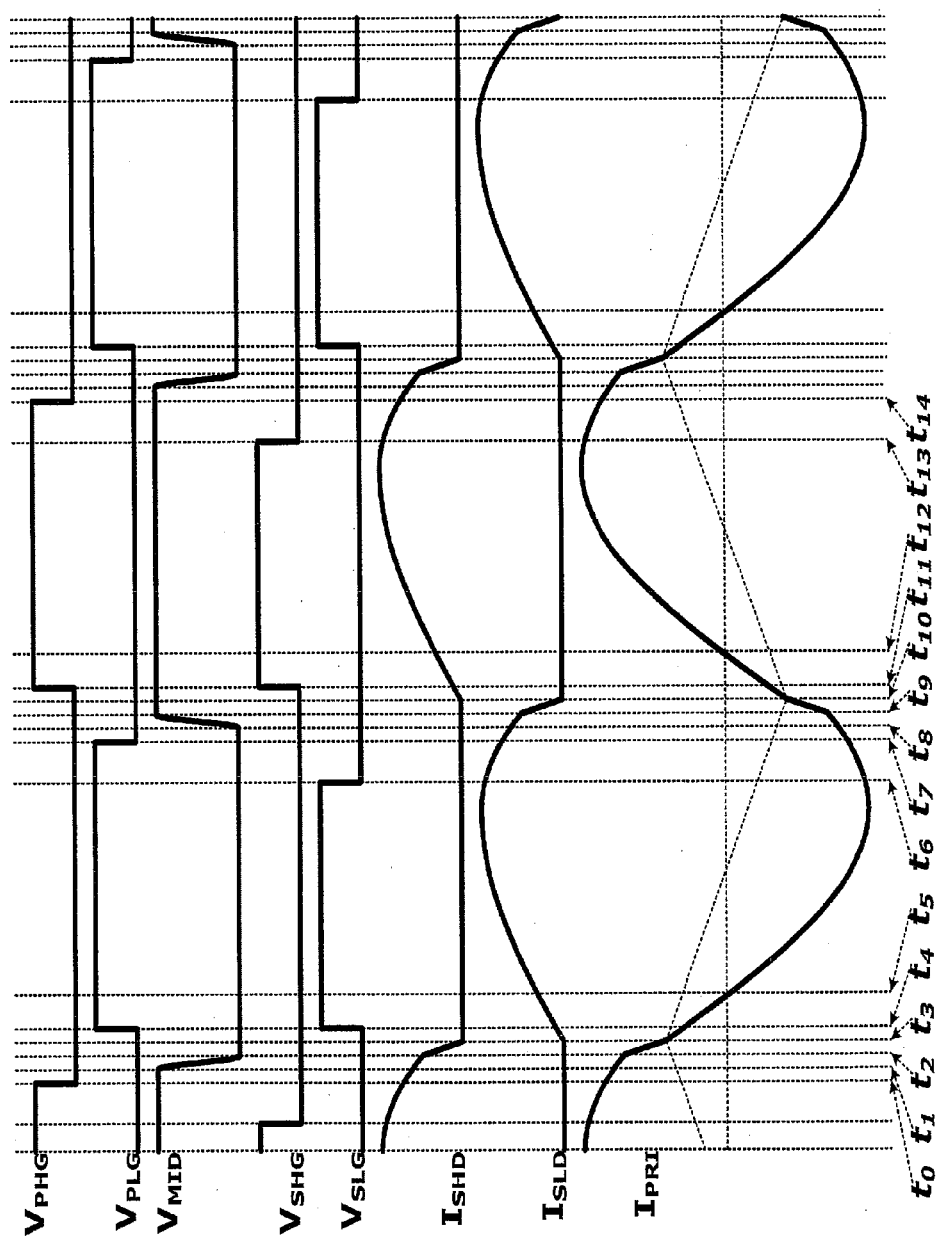
FIG. 3 illustrates a graphical representation of waveforms for an LLC power train topology constructed with synchronous rectifiers when the switching frequency is higher than resonant frequency, illustrating an embodiment.

Turning now to FIG. 3, illustrated is a graphical representation of waveforms for the LLC power train topology constructed with synchronous rectifiers when the switching frequency $f_s$ is higher than resonant frequency $f_{RES}$, illustrating the principles of the invention. Again, the waveform $V_{PHG}$ represents primary high-side gate voltage of the power MOSFET switch $Q_{PH}$, etc., as described with reference to FIG. 2.

At time $t_0$, the gate-drive voltage $V_{PHG}$ is turned off. After a brief delay, the voltage of the mid-point node $V_{MID}$ begins to decrease. From time $t_1$ to $t_2$ is the transition time for the mid-point voltage to change from $V_{BUS}$ to zero. The current for this transition, $I_{PRI}$, which is the current in the primary winding of the power transformer $T_1$, in this case is not the magnetizing current of the power transformer $T_1$.

From time $t_2$ to $t_3$, the current in the synchronous rectifier MOSFET body diode should to go to zero upon completion of reverse recovery. The time for this current going to zero is determined by the resonant capacitor voltage, the total and added leakage inductance of the power transformer $T_1$, and the driving current where the time interval $t_2$ to $t_3$ can be represented by the equation $$t_3 - t_2 = \frac{L_S \times \Delta I}{V_{CS} + N_{atr} \times V_{OUT}}.$$

In the equation above, $N_{atr}$ is the effective transformer turns ratio, $$N_{atr} = N_{phy} \times \sqrt{\frac{L_S}{L_S + L_P}},$$

and $N_{phy}$ is the physical transformer turns ratio of the power transformer $T_1$. In a worst case, this period can last for 300 ns as was demonstrated in a test board.

The primary power MOSFET switch can be turned on with normal dead time as the transition of the voltage at the mid-point node $V_{MID}$ is completed. If the associated secondary-side synchronous rectifier power MOSFET switch is turned on before completion of this phase, there is a risk of current shoot-through.

At time $t_3$, the synchronous rectifier power MOSFET switch body diode has recovered. The other synchronous rectifier power MOSFET switch body diode starts to conduct and the switching transition begins.

At time $t_4$, both the primary-side power MOSFET switch and the associated secondary-side synchronous rectifier are turned on.

At time $t_5$, the current $I_{PRI}$ in the primary winding of the power transformer $T_1$ changes direction. The primary-side power MOSFET switch should be turned on before this point in time.

The associated synchronous rectifier is kept on until time $t_6$. The primary-side power MOSFET switch MOS is turned off at time $t_7$.

The time interval from time $t_6$ to $t_7$ is the specified delay from the point of turning off the secondary-side synchronous rectifier to the point of turning off the associated primary-side power MOSFET switch.

From the waveforms illustrated in FIG. 3 when the switching frequency $f_s$ is higher than resonant frequency $f_{RES}$, it can be seen that the secondary-side power MOSFET switch is not turned off at zero current, and a current-driven synchronous rectifier concept cannot be used in a high-efficiency circuit. A better arrangement is to use timing derived from a primary-side gate-drive signal.

When the circuit is operated with a switching frequency $f_s$ higher than the resonant frequency $f_{RES}$, a primary-side MOSFET gate drive signal can be employed to turn off the associated secondary-side synchronous rectifier MOSFET at substantially the same time. But since the controller is generally on the primary side of the circuit, use of the same signal from the primary side to turn off both the primary-side and the secondary-side power MOSFET switches does not generally result in the primary-side and secondary-side power MOSFET switches turning off at the same time. Due to various circuit delays, such as the delays introduced by a gate-drive transformer coupled between the primary side and the secondary side of the circuit, secondary-side synchronous rectifier power MOSFET switches will generally be turned off slightly later when using the same drive signal to drive the power switches on both sides of the circuit. In order to turn off a secondary-side synchronous rectifier power MOSFET switch substantially simultaneously with a primary-side power MOSFET, it is necessary to design two signals to drive the primary-side and the secondary-side power MOSFET switches, one signal to drive the primary-side MOSFET, and another to drive the secondary-side MOSFET. Considering delays in driving a gate on the secondary side of the circuit from the primary side of the circuit, the signal to turn off a secondary-side synchronous rectifier power MOSFET switch should be slightly earlier than the signal used to drive the associated primary-side power MOSFET switch to maintain reliability and efficiency of the circuit.

Figure 4:
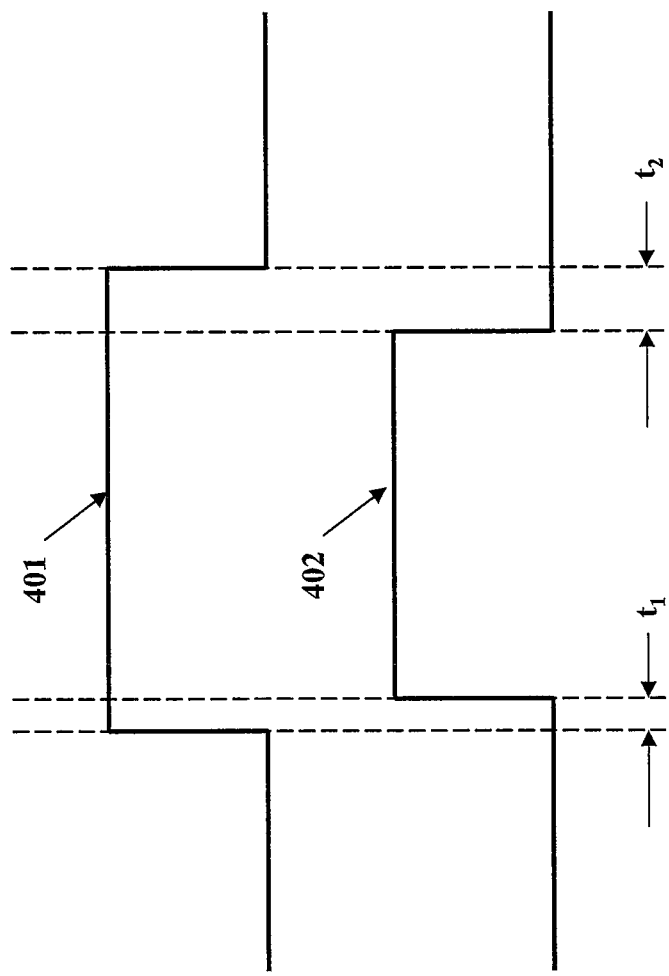
FIG. 4 illustrates a graphical representation of a waveform of a gate-drive signal employed to drive a primary-side power MOSFET switch and the waveform of a gate-drive signal employed to drive an associated secondary-side power MOSFET switch, illustrating an embodiment.

Turning now to FIG. 4, illustrated is a graphical representation of a waveform 401 of gate-drive signal, $S_{PH}$ or $S_{PL}$, employed to drive a primary-side power MOSFET switch, $Q_{PH}$ or $Q_{PL}$, and the waveform 402 of the gate-drive signal, $S_{SH}$ or $S_{SL}$, employed to drive the associated secondary-side power MOSFET switch, $Q_{SH}$ or $Q_{SL}$, illustrating an embodiment. These waveforms illustrate operation of the circuit illustrated in FIG. 1 when the switching frequency $f_s$ is higher than the resonant frequency $f_{RES}$. From the waveform illustrated in FIG. 4, the delay $t_1$ is from the signal 401 that is used to drive the primary-side power MOSFET switch rising edge to the signal 402 that is used to drive the secondary-side power MOSFET switch rising edge. The delay $t_1$ is generally be a fixed value that can be implemented during control circuit design.

The delay $t_2$ is from the falling edge of the signal 402 that is used to drive the secondary-side power MOSFET switch to the falling edge of the signal 401 that is used to drive the primary-side power MOSFET switch. The delay $t_2$ cannot be easily implemented because only the signal used to set the time of the primary-side power MOSFET switch falling edge and the delay $t_2$ are known, and obtaining the time of the falling edge of the signal 402 used to drive secondary-side power MOSFET switch is difficult.

In order for an end customer to adjust delays in the system to improve power conversion efficiency, it is advantageous for the delay $t_2$ be adjustable. As introduced herein, the delay $t_2$ is controlled by an external resistor that can be easily selected by an end customer and by an internal capacitor. An optimal value for the delay $t_2$ to provide a high level of power conversion efficiency can be readily determined employing simulation and/or laboratory techniques using methods well known in the art, which will not be described herein in the interest of brevity.

As described further hereinbelow, when switching frequency $f_s$ is higher than the resonant frequency $f_{RES}$, the falling edge of the signal used to drive a secondary-side power MOSFET switch is obtained from the signal used to set the time of the primary-side power MOSFET switch falling edge and the known delay $t_2$. The process described herein is a new design approach for the circuit for which a solution was not previously known.

Figure 5:
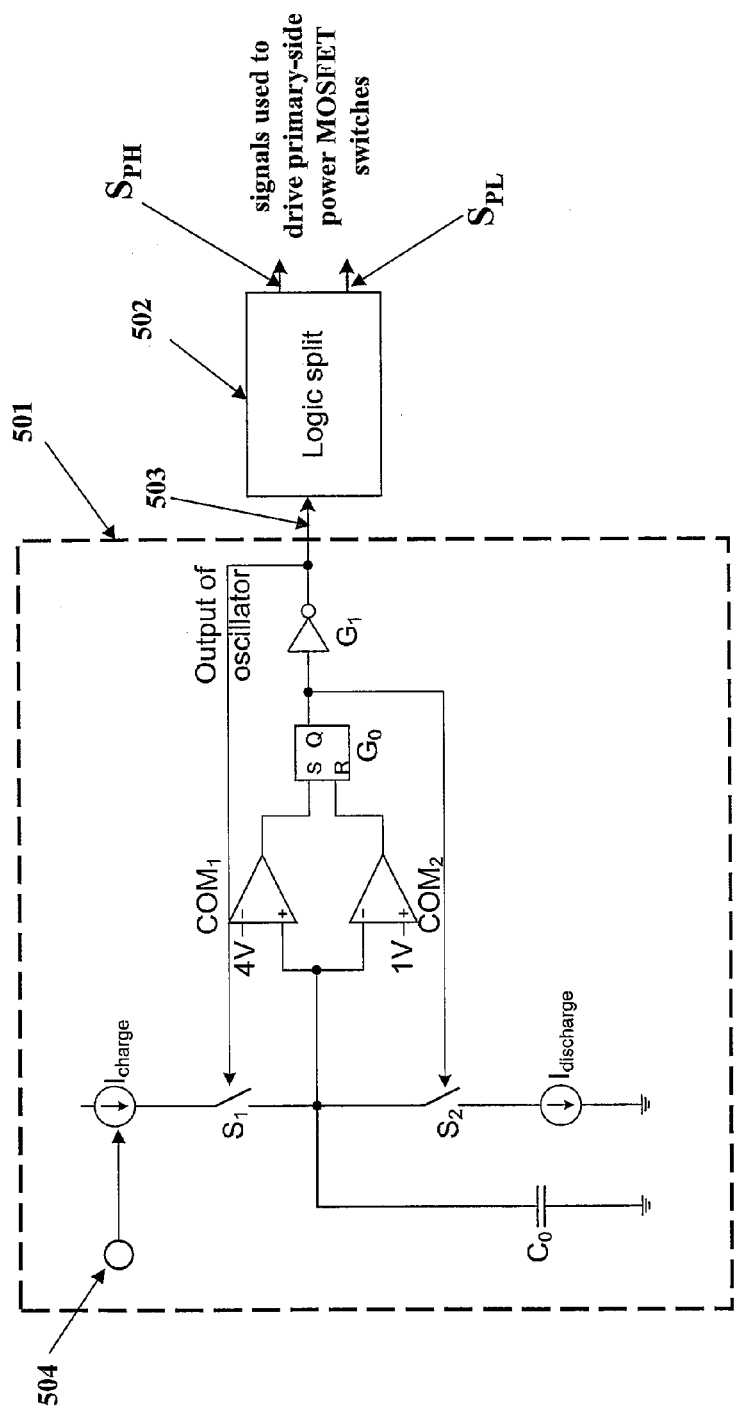
FIG. 5 illustrates a schematic drawing of an embodiment of a circuit for a signal generator employed to produce gate-drive signals to drive primary-side power MOSFET switches.

Turning now to FIG. 5, illustrated is a schematic drawing of an embodiment of a circuit for a signal generator employed to produce gate-drive signals $S_{PH}$ and $S_{PL}$ to drive the primary-side power MOSFET switches $Q_{PH}$ and $Q_{PL}$. The circuit includes oscillator circuit 501. As illustrated in FIG. 5, oscillator circuit 501 is formed with current source $I_{charge}$ and $I_{discharge}$, switches $S_1$ and $S_2$, comparators $COM_1$ and $COM_2$, set-reset ("S-R") flipflop $G_0$, inverter $G_1$, and internal capacitor $C_0$. Current source $I_{charge}$ and $I_{discharge}$ are used to charge and discharge capacitor $C_0$ for the oscillator circuit 501. The current $I_{discharge}$ is employed to set the dead time between enabling conductivity of the primary-side power MOSFET switches, and is typically set to about 2% of a switching cycle. Switches $S_1$ and $S_2$ are used to disable the charging current $I_{charge}$ when the voltage across the capacitor $C_0$ is above a higher threshold voltage, e.g., 4 V as illustrated in FIG. 5, or to disable the discharging current $I_{discharge}$ when voltage across the capacitor $C_0$ is lower than a lower threshold voltage, e.g., 1 V as illustrated in FIG. 5. Comparators $COM_1$ and $COM_2$ and the threshold voltages (1 V, 4 V) set the control limits for the oscillator. The internal capacitor $C_0$ is used for the charging and discharging purpose in the oscillator circuit. The S-R flipflop $G_0$ is used to set and reset the output signals of the two comparators $COM_1$ and $COM_2$. The signal 504 is produced by a feedback loop coupled to an output characteristic of the power converter, such as an output voltage, to control the current level of the current source $I_{charge}$ to control the switching frequency of the power converter. Control of the switching frequency of the power converter is employed to regulate the output characteristic thereof.

The logic split circuit 502 includes a divide-by-two frequency divider and gate-drive circuit elements to produce the high-side gate-drive signal $S_{PH}$ and the low-side gate drive signal $S_{PL}$. Frequency dividers and gate-drive circuits are well known in the art and will not be described further herein in the interest of brevity.

Figure 6:
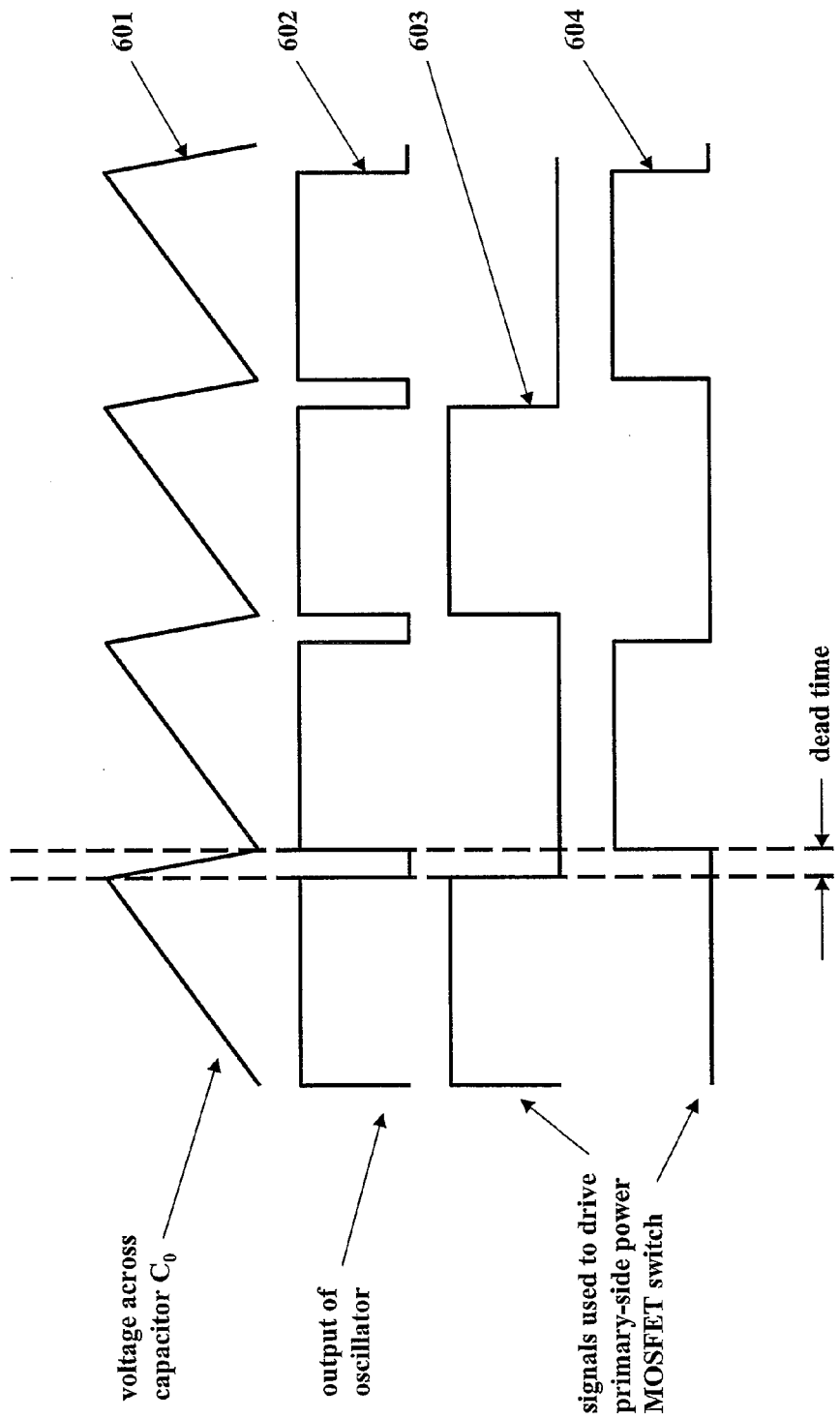
FIG. 6 illustrates graphical representations of waveforms generated by the oscillator and the logic split circuit illustrated in FIG. 5.

Turning now to FIG. 6, illustrated are graphical representations of waveforms generated by the oscillator 501 and the logic split circuit 502. Waveform 601 illustrates the saw-tooth voltage waveform produced across the capacitor $C_O$. Waveform 602 illustrates the output waveform of the oscillator 501. Waveforms 603 and 604 show the signal waveforms $S_{PH}$ and $S_{PL}$ used to drive the primary-side power MOSFET switches $Q_{PH}$ and $Q_{PL}$. The waveforms $S_{PH}$ and $S_{PL}$ are generated by the oscillator 501 and the logic split circuit 502. A dead time is illustrated in FIG. 6 to prevent shoot-through of the primary-side power MOSFET switches $Q_{PH}$ and $Q_{PL}$.

Having obtained the signal waveforms $S_{PH}$ and $S_{PL}$ used to drive the primary-side power MOSFET switches, generation of the end-user adjustable time delay $t_2$ is now described.

Figure 7:
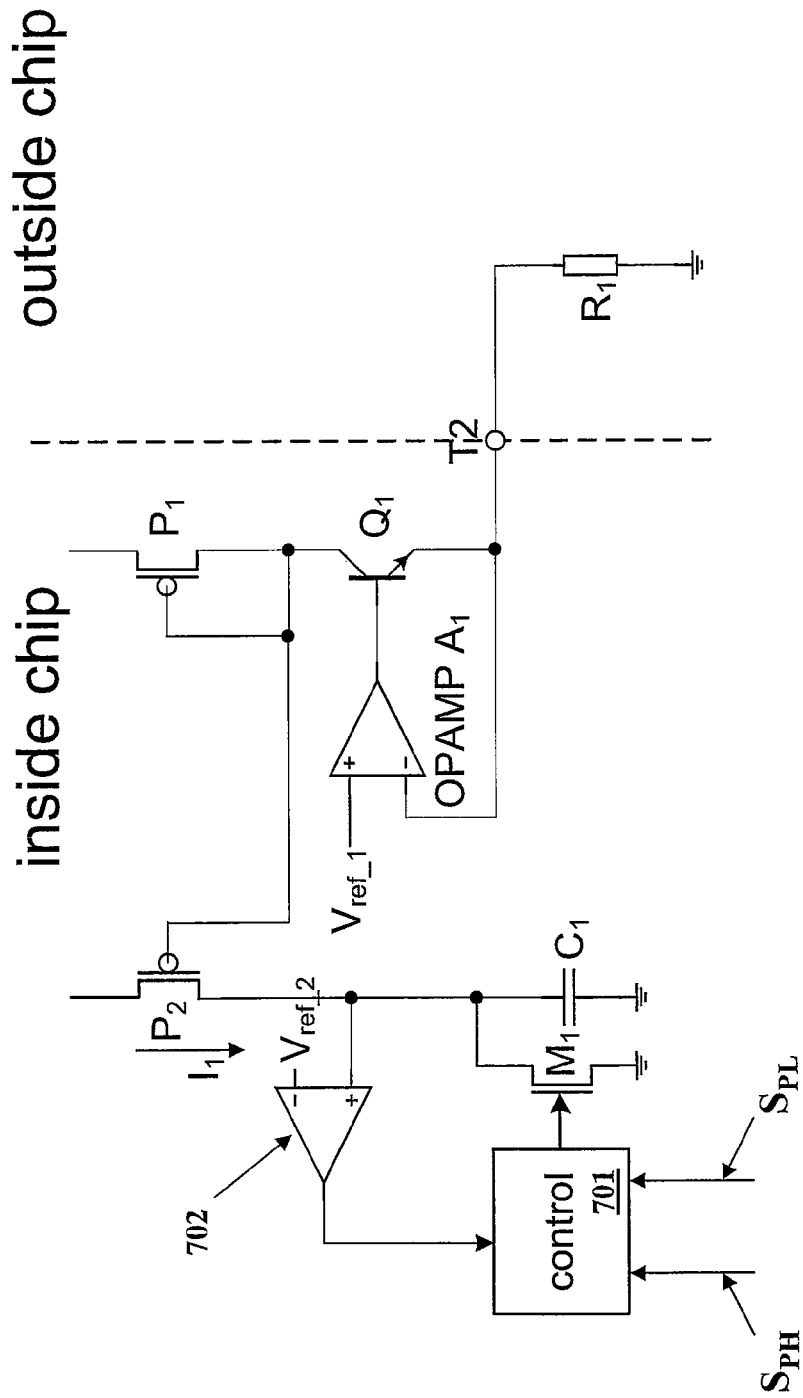
FIG. 7 illustrates a schematic diagram of an embodiment of a circuit to generate an end-user adjustable delay time, constructed according to the principles of the invention.

Turning now to FIG. 7, illustrated is a schematic diagram of an embodiment of a circuit to generate an end-user adjustable delay time $t_2$. An operational amplifier $A_1$, the output of which is coupled to the base of bipolar transistor $Q_1$, is used to set the voltage of pin T2 to be equal to a reference voltage Vref_1. An external resistor $R_1$ (with resistance represented by the symbol $R_1$) is coupled to the pin T2. The current $I_{R1}$ through pin T2 can be computed from the equation $$I_{R1} = \frac{V_{ref\_1}}{R_1}.$$

The current $I_{R1}$ is mirrored in a current mirror formed with internal PMOS transistors $P_1$ and $P_2$. The current $I_1$, which is the current through PMOS transistor $P_2$, is used to charge the internal capacitor $C_1$ within the voltage limit set by the voltage Vref_2. Control block 701, which is coupled to the output of comparator 702, drives the gate of small MOSFET M1, which will control the discharge of capacitor $C_1$ during the dead time. Charging the capacitor $C_1$ by a current source within a limited voltage range sets the time delay $t_2$ as represented below by equation (1):

$$t_2 = \frac{C_1 \times V_{ref\_2}}{I_1} = \frac{C_1 \times V_{ref\_2}}{n \times \frac{V_{ref\_1}}{R_1}} \quad (1)$$

In equation (1), the parameter "n" is the current mirror current-amplification parameter, and its value is $$\left(\frac{W}{L}\right)_{p2} \Big/ \left(\frac{W}{L}\right)_{p1},$$

where the parameters "W" and "L" represent the geometric width and length, respectively, of the active semiconductor areas of the PMOS transistors $P_1$ and $P_2$.

From equation (1), since the resistance of the external resistor $R_1$ is selectable by the end-user, the time delay $t_2$ is adjustable and controlled by the end-user.

Figure 8:
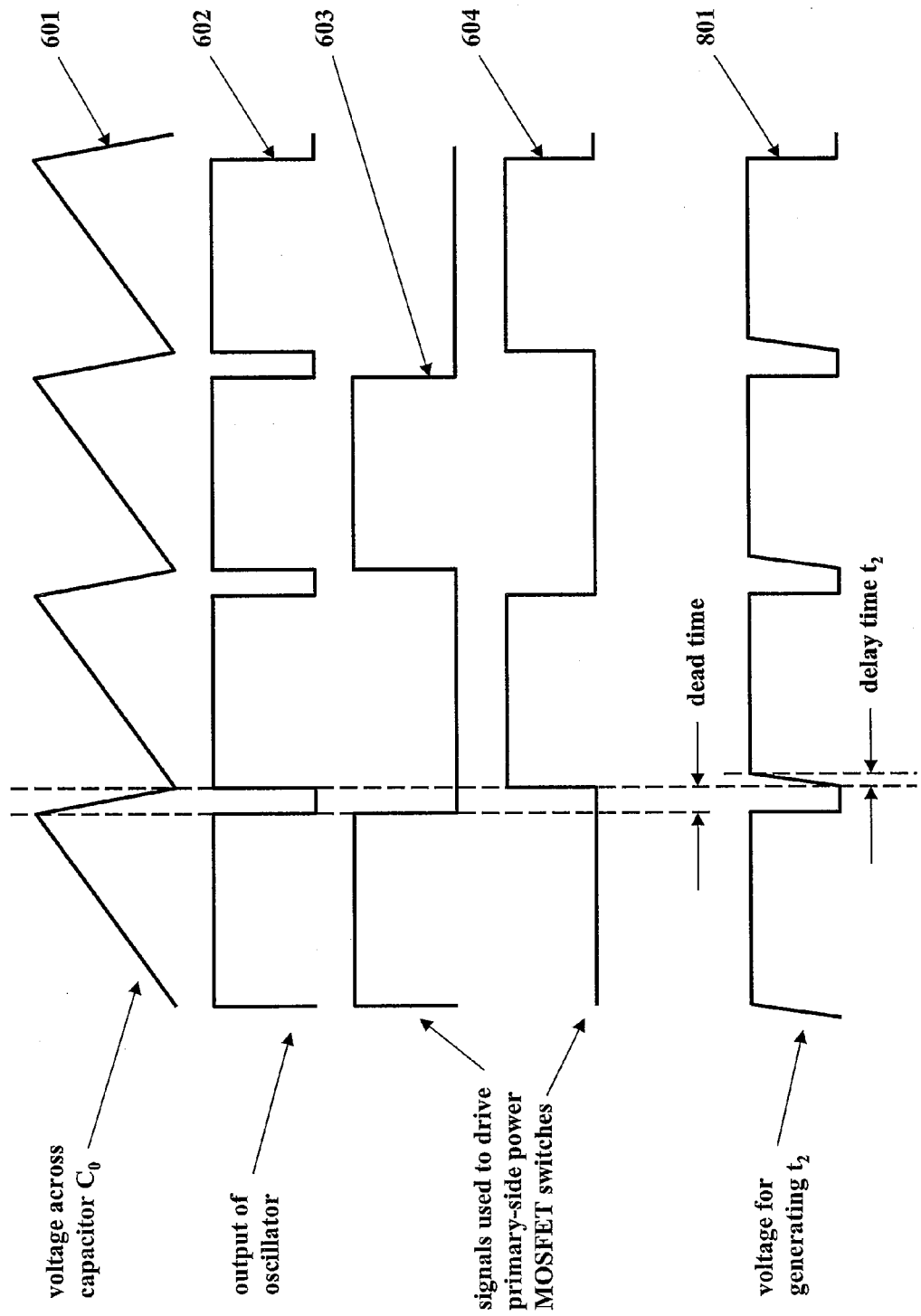
FIG. 8 illustrates a graphical representation of waveforms produced by a controller, constructed according to the principles of the invention.

Turning now to FIG. 8, illustrated is a graphical representation of waveforms produced by a controller constructed according to the principles of the invention. FIG. 8 illustrates waveform 801, which is the voltage produced across the capacitor $C_1$. The voltage produced across capacitor $C_1$ is employed to generate the delay $t_2$. This voltage waveform and the time delay $t_2$ are generated from the beginning of the rising edge of the signal 604 used to drive primary-side power MOSFET switch $Q_{PH}$ or $Q_{PL}$. The requirement for the delay $t_2$ for the signal used to drive the respective secondary-side power MOSFET switch is having a delay advance before the falling edge of the signal 604 used to drive a primary-side power MOSFET switch.

Because the delay $t_2$ is defined by external resistor $R_1$, and its charging current is accordingly selectable by the end-user, it cannot be directly employed as the charging current in the oscillator circuit 501 illustrated in FIG. 5. It is necessary to introduce another delay whose delay is the same as the delay $t_2$. The same value of charging current and the same value of capacitance are used for this delay as in the oscillator circuit 501. In an embodiment, a proportionately larger value of charging current and a proportionately larger value of capacitance can also be used for this delay.

Figure 9:
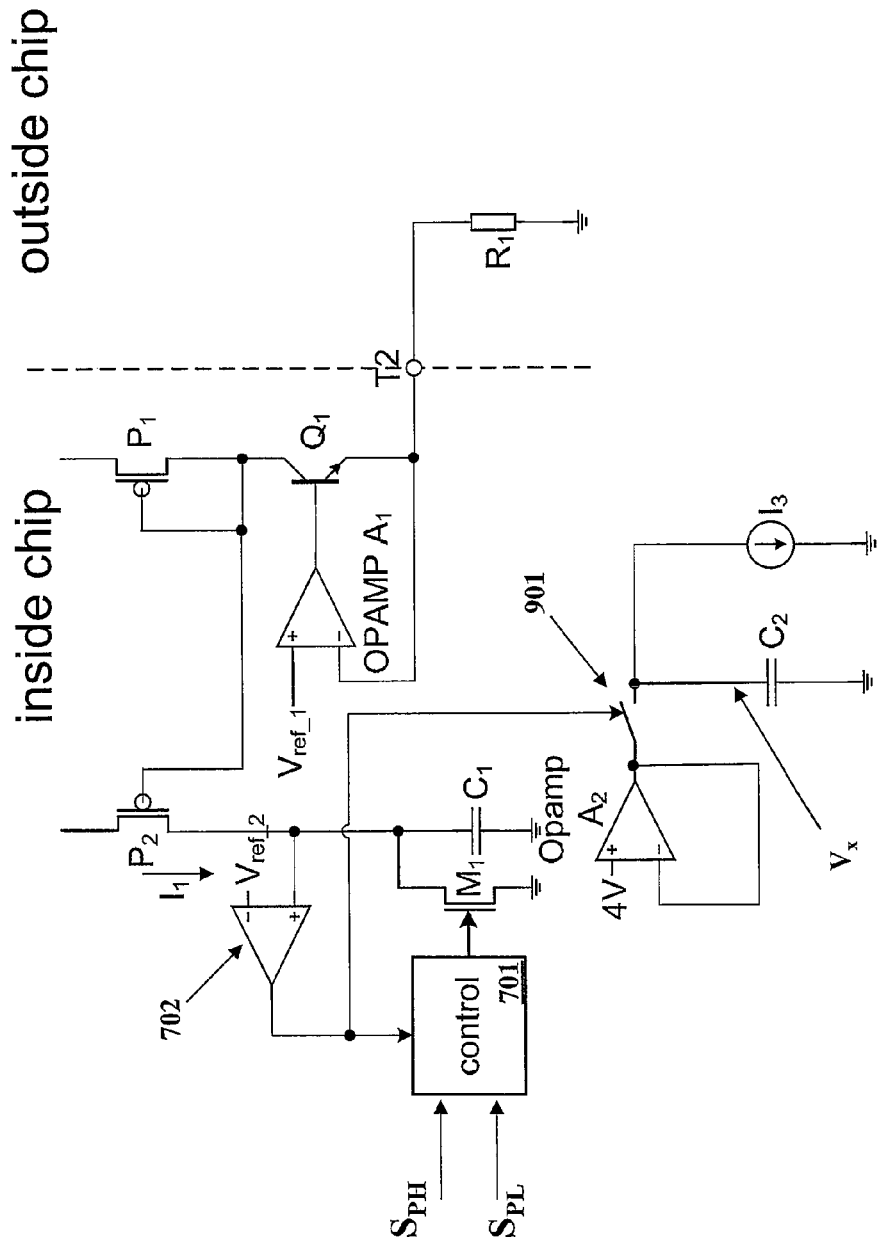
FIG. 9 illustrates a schematic diagram of an embodiment of a circuit employed to generate a further signal delay, constructed according to the principles of the invention.

Turning now to FIG. 9, illustrated is a schematic diagram of an embodiment of a circuit employed to generate the further delay. In this schematic diagram, the capacitor $C_2$ that is charged and discharged has the same value as the capacitor $C_0$ used in the oscillator 501 illustrated in FIG. 5. The discharging current $I_3$ has the same value as the current $I_{charge}$ used in oscillator 501 illustrated in FIG. 5. The operational amplifier $A_2$ coupled to a 4 V reference at its noninverting input produces a 4 V output signal that is coupled to a switched terminal of switch 901. In this manner, the capacitor $C_2$ is charged to 4 V when the switch 901 is closed. Switch 901 is controlled by the output of comparator 702 that is coupled to capacitor $C_1$, and is controlled by the voltage across that capacitor. The delay time produced by the circuit illustrated in FIG. 9 generated by capacitors $C_1$ and $C_2$ is also the same as the delay $t_2$. So the voltage generated by the discharging current $I_3$ during the delay will indicate how much voltage difference will be used in the oscillator circuit-charging period to generate the delay $t_2$.

Figure 10:
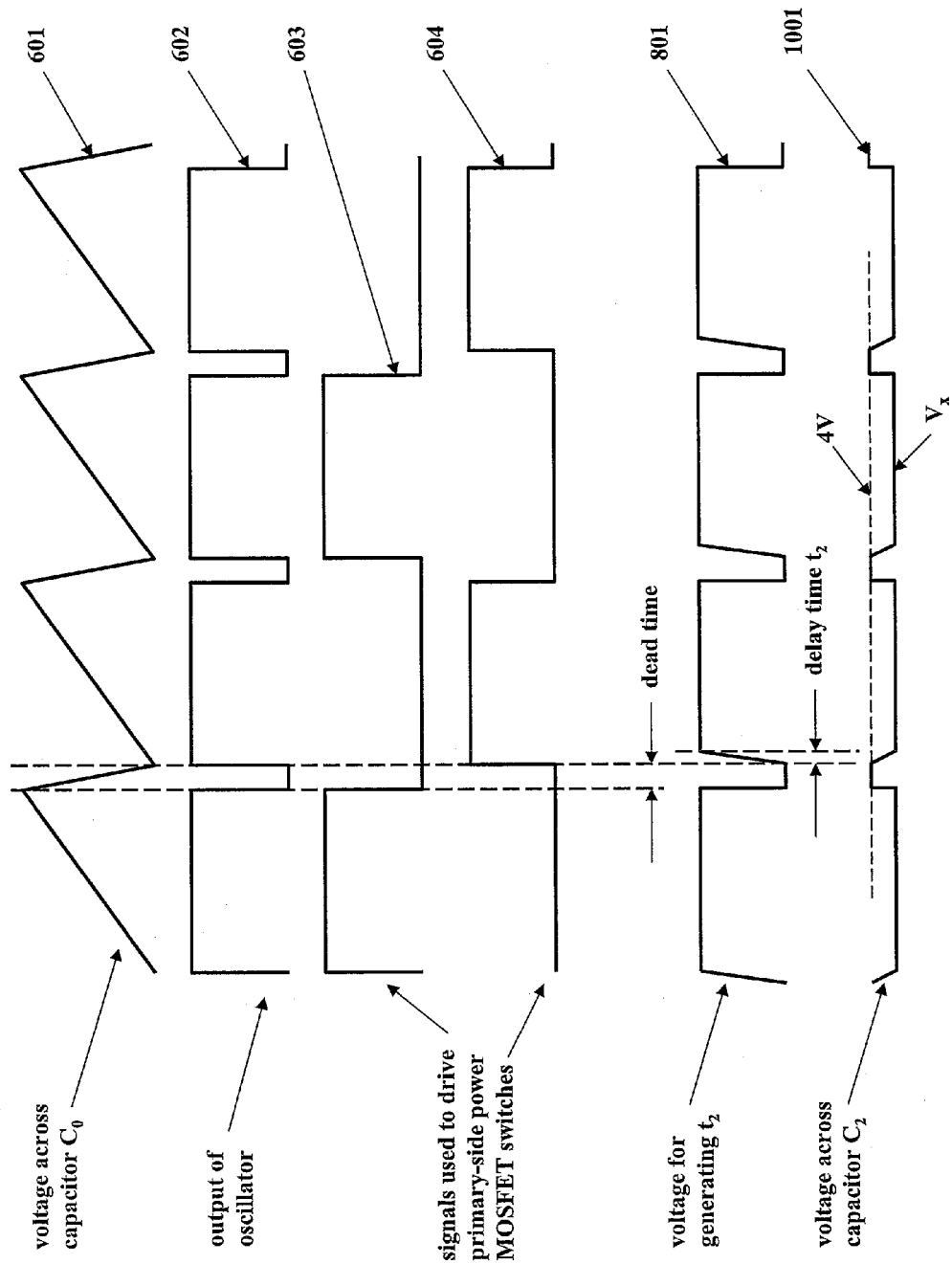
FIG. 10 illustrates a graphical representation of waveforms produced by a controller, constructed according to the principles of the invention.

Turning now to FIG. 10, illustrated is a graphical representation of waveforms produced by a controller, constructed according to the principles of the invention, particularly the voltage across capacitor $C_2$ represented by the waveform 1001. During the period of the dead time, the voltage over capacitor $C_2$ is held to 4.0 V. Accordingly, a low-leakage capacitor should preferably be selected for capacitor $C_2$. This voltage (4 V) is the upper limit for the oscillator voltage produced across the capacitor $C_0$. During the period of the delay $t_2$, the capacitor $C_2$ is discharged by discharge current $I_3$, so there is one voltage drop during this period. By the end of the delay time, the voltage over capacitor $C_2$ is held until the next switching cycle.

The final voltage $V_x$ after the discharging period can be represented by the equation $$V_X = 4.0 \text{ V} - \frac{t_2 \times I_3}{C_2} = 4.0 \text{ V} - \frac{t_2 \times I_{charge}}{C_0}. \tag{2}$$

Figure 11:
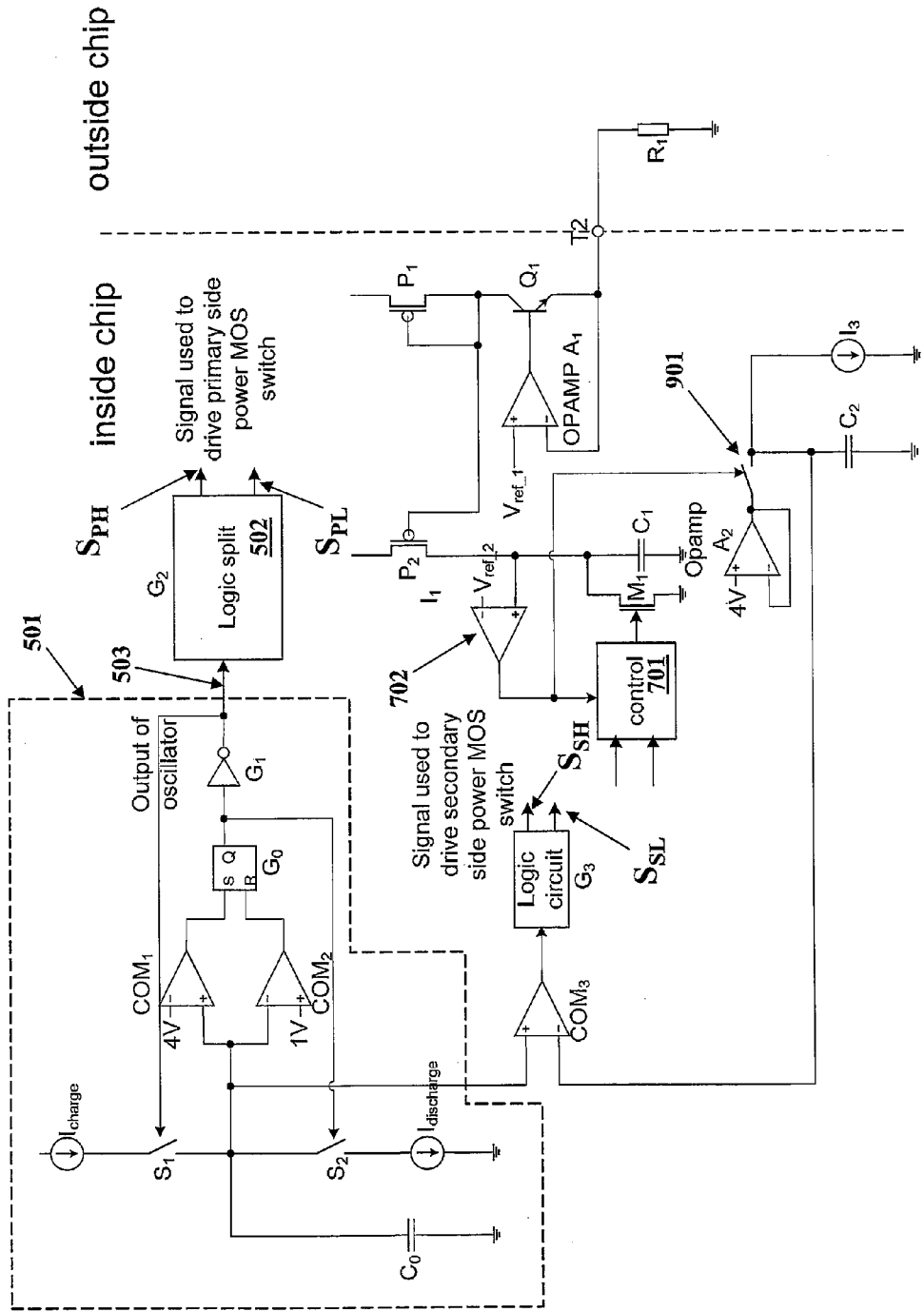
FIG. 11 illustrates a schematic diagram of an embodiment of the assembled circuit elements described previously hereinabove with reference to FIGS. 5, 7, and 9 to generate the signals used to drive secondary-side power MOSFET switches.

Turning now to FIG. 11, the voltage across the capacitor $C_2$ is used to generate the signals that are employed to drive the secondary-side power MOSFET switches. From the schematic diagram illustrated in FIG. 11, comparator $COM_3$ and logic circuit $G_3$ are employed to obtain the signals $S_{SH}$ and $S_{SL}$ used to drive secondary-side power MOSFET switches.

Because the voltage $V_x$ is used as reference to obtain the delay from the signal used to drive secondary-side power MOSFET switches to the signal used to drive primary-side power MOSFET switches, the time required in the oscillator 501 to charge capacitor $C_0$ from the voltage level $V_x$ to 4.0 V can be represented by equation (3):

$$T_{delay} = \frac{(4.0 \text{ V} - V_x) \times C_0}{I_{charge}}. \tag{3}$$

Substituting equation (2) into equation (3) results in equation (4):

$$T_{delay} = \frac{\left(4.0 \text{ V} - 4.0 \text{ V} + \frac{t_2 \times I_{charge}}{C_0}\right) \times C_0}{I_{charge}} = t_2 \tag{4}$$

From equation (4), the advanced delay generated in the circuit from the signal used to drive secondary-side power MOSFET switches to the signal used to drive primary-side power MOSFET switches is controlled by the external resistor $R_1$. Accordingly, the advanced delay $t_2$ is externally controlled by the end user. Thus, voltage produced across capacitor $C_2$ can be used to define the signal used to drive a secondary-side power MOS switch.

Figure 12:
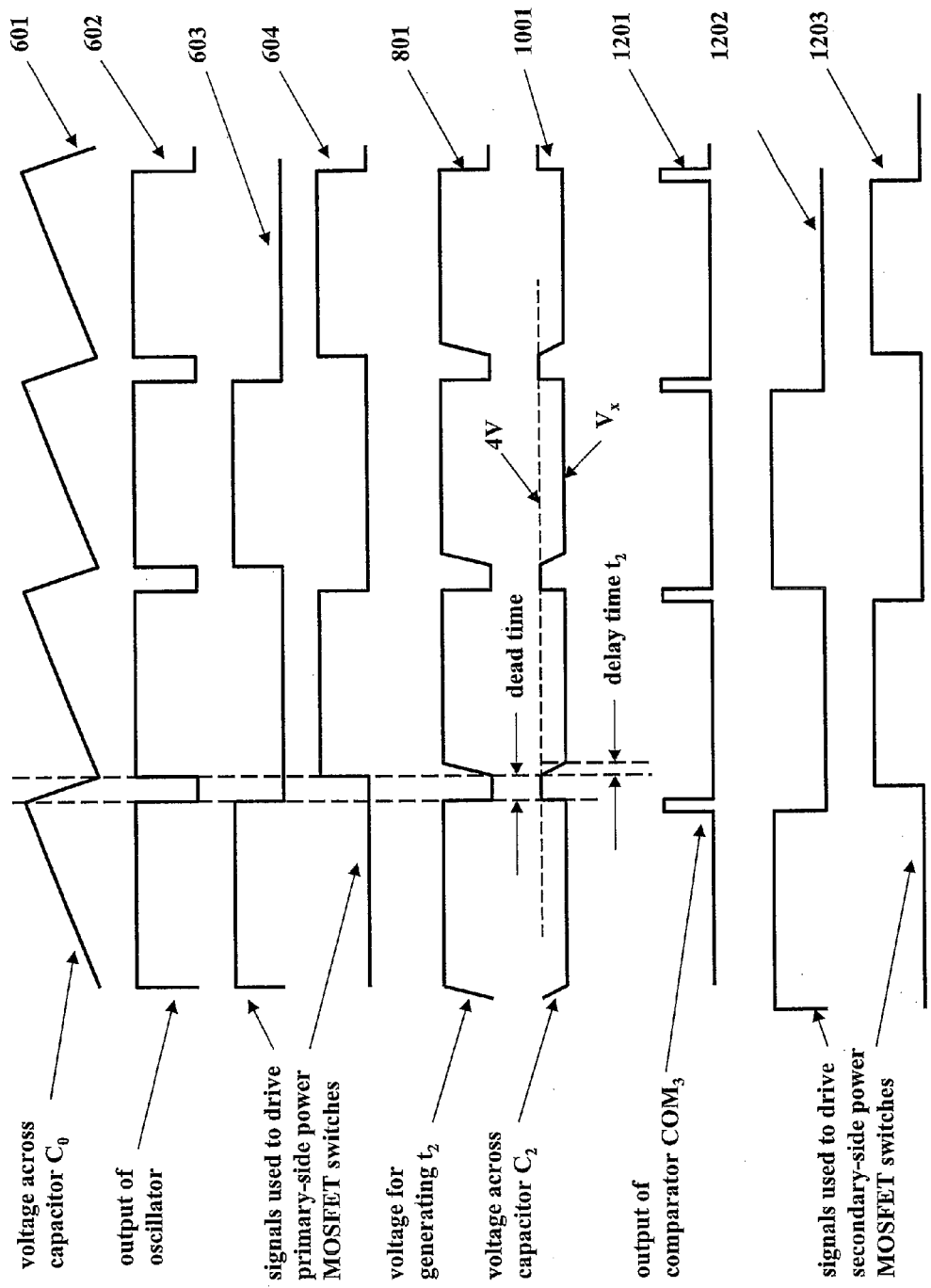
FIG. 12 illustrates a graphical representation of waveforms produced by a controller, constructed according to the principles of the invention.

Turning now to FIG. 12, illustrated is a graphical representation of waveforms produced by the controller, constructed according to the principles of the invention. FIG. 12 illustrates the output of comparator $COM_3$ with waveform 1201, the secondary-side gate-drive signal $S_{SH}$ for synchronous rectifier MOSFET $Q_{SH}$ with waveform 1202, and the secondary-side gate-drive signal $S_{SL}$ for synchronous rectifier MOSFET $Q_{SH}$ with waveform 1203, illustrating an embodiment.

Figure 13:
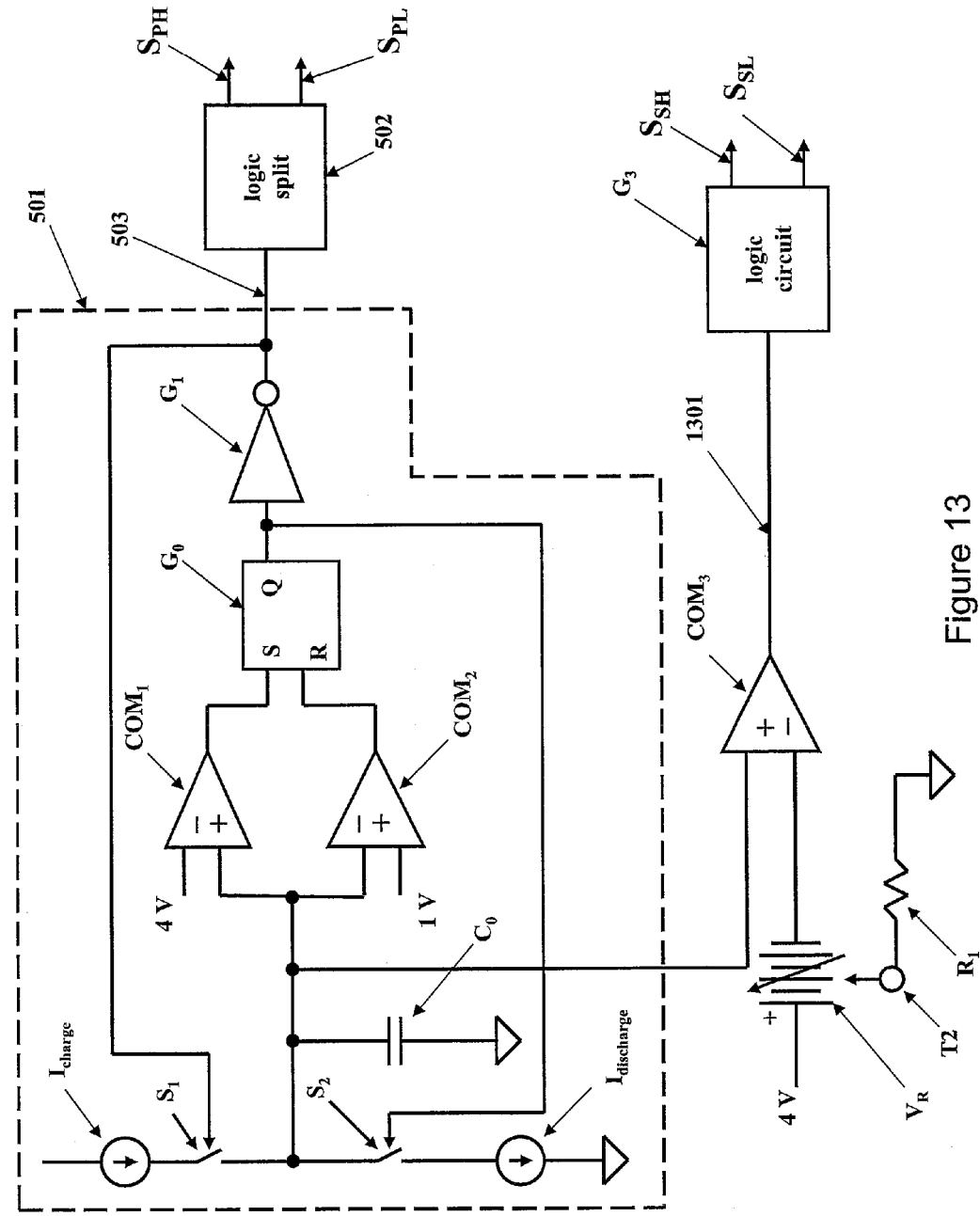
FIG. 13 illustrates a schematic diagram illustrating a structure for a controller for an LLC power train circuit topology to illustrate principles of the invention.

Turning now to FIG. 13, illustrated is a schematic diagram illustrating a structure for a controller for an LLC power train circuit topology to illustrate principles of the invention. A number of the circuit elements are reproduced from FIGS. 5, 7, 9, and 11, and will not be redescribed in the interest of brevity. FIG. 13 illustrates comparator $COM_3$ coupled to the capacitor $C_0$ in the oscillator 501, across which a sawtooth voltage waveform is produced as illustrated by the waveform 601 in FIG. 6. This sawtooth voltage waveform is coupled to comparators $COM_1$ and $COM_2$ to produce timing for signals employed to drive the primary-side power MOSFET switches. As illustrated in FIG. 13, comparator $COM_3$ is also coupled to the capacitor $C_0$ in the oscillator 501. However, the inverting input of comparator $COM_3$ is coupled to the 4 V reference voltage source with an adjustable offset voltage $V_R$, represented in FIG. 13 by a battery, with the adjustable offset voltage $V_R$ dependent on the external resistor $R_1$. The adjustable offset voltage $V_R$ enables comparator $COM_3$ to produce output signal 1301 with timing that anticipates the signal 503 produced by the oscillator 501, advantageously with delay $t_2$.

When switching frequency $f_s$ is lower than resonant frequency $f_{RES}$, then a maximum on time for secondary-side synchronous rectifier is required for efficient operation of the circuit. But the maximum secondary-side synchronous rectifier on time is not fixed, and for efficient circuit operation, it depends on a load condition/output current.

Figure 14:
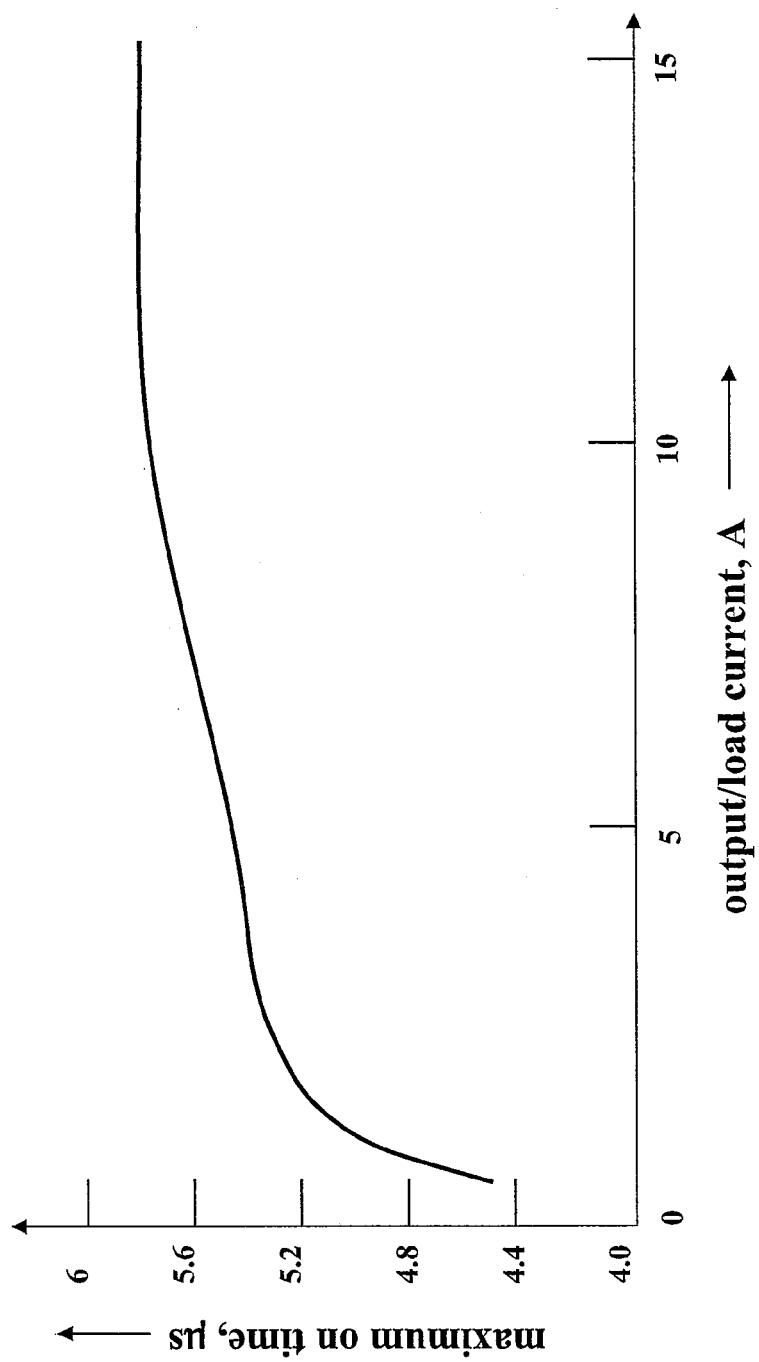
FIG. 14 illustrates a graphical representation of a function that shows a relationship between maximum on time and power converter output current for an exemplary power converter, constructed according to the principles of the invention.

Turning now to FIG. 14, illustrated is a graphical representation of a function that shows a relationship between maximum on time and power converter output current for an exemplary power converter, constructed according to the principles of the invention. In FIG. 14, the horizontal axis represents power converter output (or load) current in amperes, and the vertical axis represents maximum on time of the secondary-side synchronous rectifier in microseconds ("μs"). From the graphical representation illustrated in FIG. 14, it can be seen that maximum on time is not fixed, and depends on the power converter output current (or other load condition). When output current is high, maximum on time is longer. When output current is low, maximum on time is shorter. And when output current is more than 10 A for the exemplary power converter, maximum on time is substantially constant, independent of output current.

As introduced herein, a function with an increasing dependence on a power converter output current is employed to determine a maximum on time for a secondary-side synchronous rectifier therein. The maximum on time is fixed at a substantially constant level by this function when output current is more than a threshold value.

Figure 15:
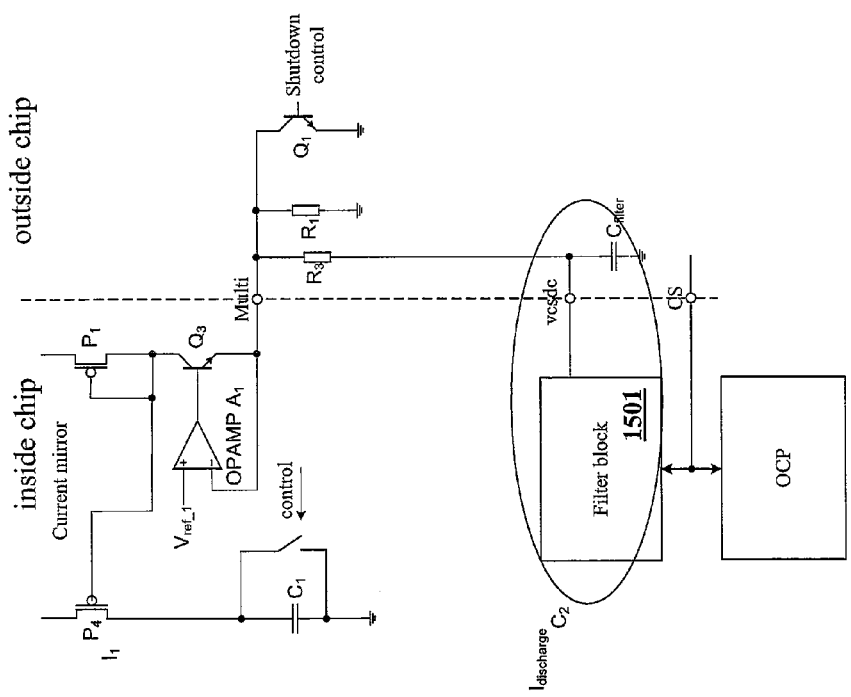
FIG. 15 illustrates a schematic drawing of a portion of a controller that may be employed to determine a maximum on time setting for a secondary-side synchronous rectifier in an LLC power train dependent on an output current of the power converter, constructed according to the principles of the invention.

Turning now to FIG. 15, illustrated is a schematic drawing of a portion of a controller that may be employed to determine a maximum on time setting for a secondary-side synchronous rectifier in an LLC power train dependent on an output current of the power converter, constructed according to the principles of the invention.

The controller is formed with a filter block coupled to a current-sense pin (i.e., circuit node) CS that senses a signal representing a current in the primary side of the power converter, for example a current in the primary winding of power transformer $T_1$ illustrated in FIG. 1. Further details of the filter block are illustrated in FIG. 16, to which reference is also now made.

The current-sense signal at the current-sense pin CS is coupled to an internal filter block 1501 that amplifies the current-sense signal CS with dc and ac components to a higher-level waveform, and filers and clamps it when the dc component of the current-sense signal CS is higher than a voltage threshold level. The current-sense signal CS includes both dc and high-frequency (sinusoidal) ac components. To remove the high-frequency ac components, the filter block illustrated in FIG. 15 includes a buffer stage formed with an operational amplifier as a gain stage. After the buffer stage, there is a filter that includes internal resistor R2 and external capacitor $C_{filter}$. A voltage-clamping circuit 1601 includes bipolar transistor $Q_1$ and $Q_2$ and internal current source $I_{fixed}$. The voltage-clamping circuit 1601 clamps the filtered dc signal introduced at the current-sense pin CS to a level no greater than 2.0 V.

The current-sense pin CS is also used as a signal input to an over-current protection ("OCP") function for the power converter.

Figure 16:
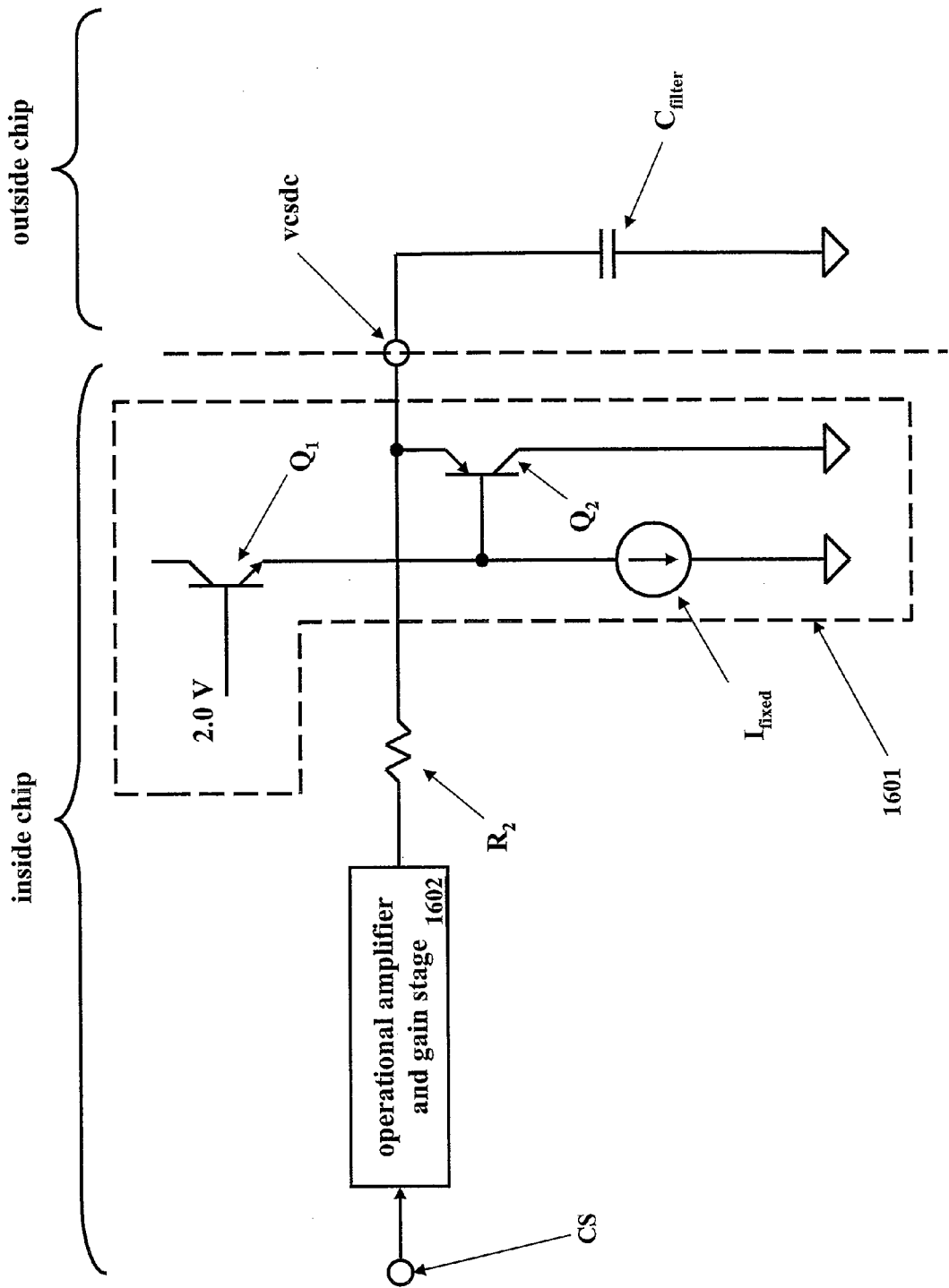
FIG. 16 illustrates further details of the filter block are illustrated in FIG. 15.

With continuing reference to FIG. 16, the input signal is the current-sense signal CS that is coupled to operational amplifier and a gain stage 1602 that produces an amplified current-sense signal. The amplified current-sense signal is filtered with resistor $R_2$ and external capacitor $C_{filter}$ coupled to the pin vcsdc to produce a dc signal that is clamped to a level no greater than 2.0 V. If the amplified and filtered current-sense signal is less than 2.0 V, the clamping operation is not operative. If the amplified and filtered current-sense signal would be more than 2.0 V, the clamping circuit 1601 operates to clamp the signal to a level no greater than 2.0 V.

In FIG. 15, the pin "multi" is coupled to the amplified and filtered output of the filter block 1501, and the voltage value of the pin multi is set to 2.0 V by voltage reference Vref_1 coupled to operational amplifier OPAMP $A_1$ and bipolar transistor Q3. If a resistor is externally connected to the pin multi, the current through this pin will be determined and mirrored to the internal current mirror formed with PMOS MOSFETs $P_1$ and $P_2$.

A component of this current set by the external resistor $R_1$ is mirrored internally by PMOS MOSFETs $P_1$ and $P_4$ and used to charge an internal capacitor $C_1$ to obtain a maximum on time for the secondary-side power MOSFET switches (synchronous rectifiers). But if only this current is used to charge the internal capacitor, the maximum on time will be fixed and not dependent on a load current or a loading condition.

The load current/loading condition can be determined by the average voltage level of the current-sense signal at the pin CS. If load current is high, the average voltage level at the current-sense pin CS will be high. If load current is low, the average voltage level at the current-sense signal at the pin CS will be low.

To obtain a filtered current-sense CS and match the voltage at the pin multi, the high frequency sinusoidal components of the current-sense signal CS are filtered and amplified, as illustrated in FIG. 15. When load current is more than 10 A in this exemplary embodiment, maximum on time is fixed and does not depend on load current. Accordingly, the filtered and amplified current-sense signal CS in this embodiment is clamped to a level no greater than 2.0 V.

As illustrated in FIG. 15, the pin vcsdc is connected to the pin multi through resistor $R_3$. As a result, current through pin multi is the sum of currents through external resistor $R_1$ and current through external resistor $R_3$. Resistor $R_1$ sets a current that is employed to charge internal capacitor $C_1$ to set a maximum on time for the secondary-side synchronous rectifiers when load current is more than 10 A. Resistor $R_3$ sets a current that depends on an average voltage level of the current-sense signal CS and is summed at pin multi and be mirrored by PMOS MOSFETs $P_1$ and $P_2$ to charge the internal capacitor $C_1$ to obtain the maximum on time for a secondary-side synchronous rectifier.

When load current is low, the current-sense signal CS dc level is low, and after filtering and amplifying, the current-sense signal CS is limited to a dc level no greater than 2.0 V. The limited current-sense signal CS sets the current through external resistor $R_3$. The current that flows through resistor $R_3$ is summed with current that flows through external $R_1$ resistor-controlled current to the pin multi. The resulting current through the pin multi is higher. The higher current is internally mirrored and be used to charge the internal capacitor $C_1$ to obtain the maximum on time. The maximum on time set by a lower loading condition will be shorter as desired from FIG. 14.

When load current is higher, the current-sense signal CS dc level will be higher. After filtering and amplifying, the current-sense signal CS is limited to the dc level of 2.0 V, since the voltage at the pin multi is 2.0 V. The higher but limited current-sense signal CS sets the current through external resistor $R_3$ to be lower. The lower current flowing through resistor $R_3$ is summed with the current set by external resistor $R_1$ at the pin multi. The summed current through the pin multi will be lower. The lower current is internally mirrored and used to charge the internal capacitor $C_1$ to obtain the maximum on time. The maximum on time is set by the higher loading condition, and will be longer and as desired by the function illustrated in FIG. 14.

When load current is higher than a certain value, for example 10A in this exemplary embodiment, the current-sense signal CS dc level will be very high. After filtering and amplifying, the current-sense signal CS is limited to a dc level by clamping to 2.0 V. Because the voltage of the pin multi is 2.0 V, no current flows through external resistor $R_3$. The current through the pin multi will only consist of current flowing through the external resistor $R_1$ and will be a low value. Again, this load current level will be internally mirrored and used to charge the internal capacitor $C_1$ to obtain the maximum on time for the secondary-side synchronous rectifiers. The maximum on time set by this loading condition will be the longest as expected by the function illustrated in FIG. 14.

Figure 17:
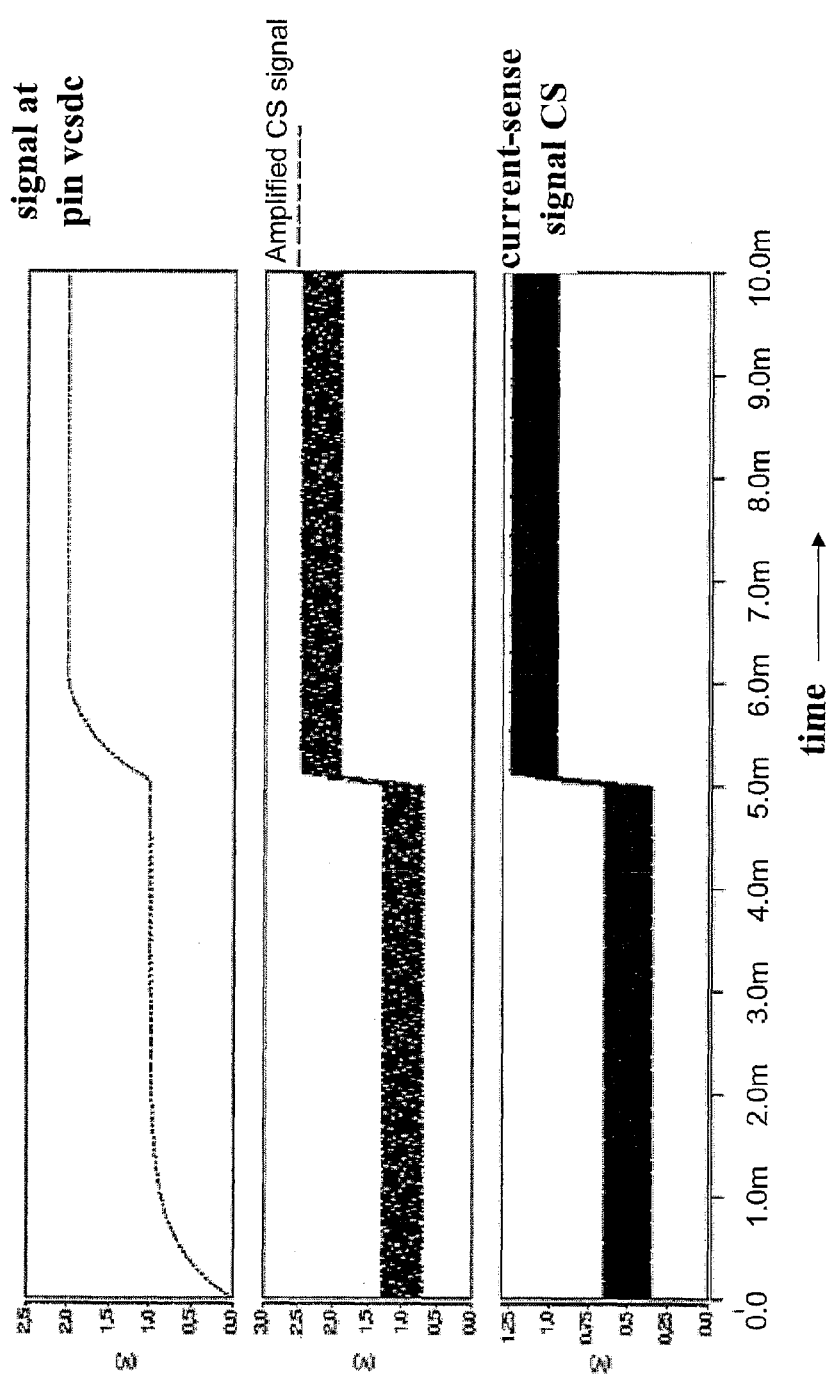
FIG. 17 illustrates a graphical representation of a current-sense signal CS, an amplified current-sense signal, and a signal at the pin vcsdc.

Turning now to FIG. 17, illustrated is a graphical representation of the current-sense signal CS in the lower portion of the figure, the amplified current-sense signal in the middle portion of the figure, and the signal at the pin vcsdc in the upper portion of the figure. As illustrated in FIG. 17, the current-sense signal CS is amplified roughly by a factor of 2.0, and limited to a maximum value of 2.0 V. as illustrated in the upper portion of FIG. 17, the high-frequency components of the signal are removed by the filtering process.

Figure 18:
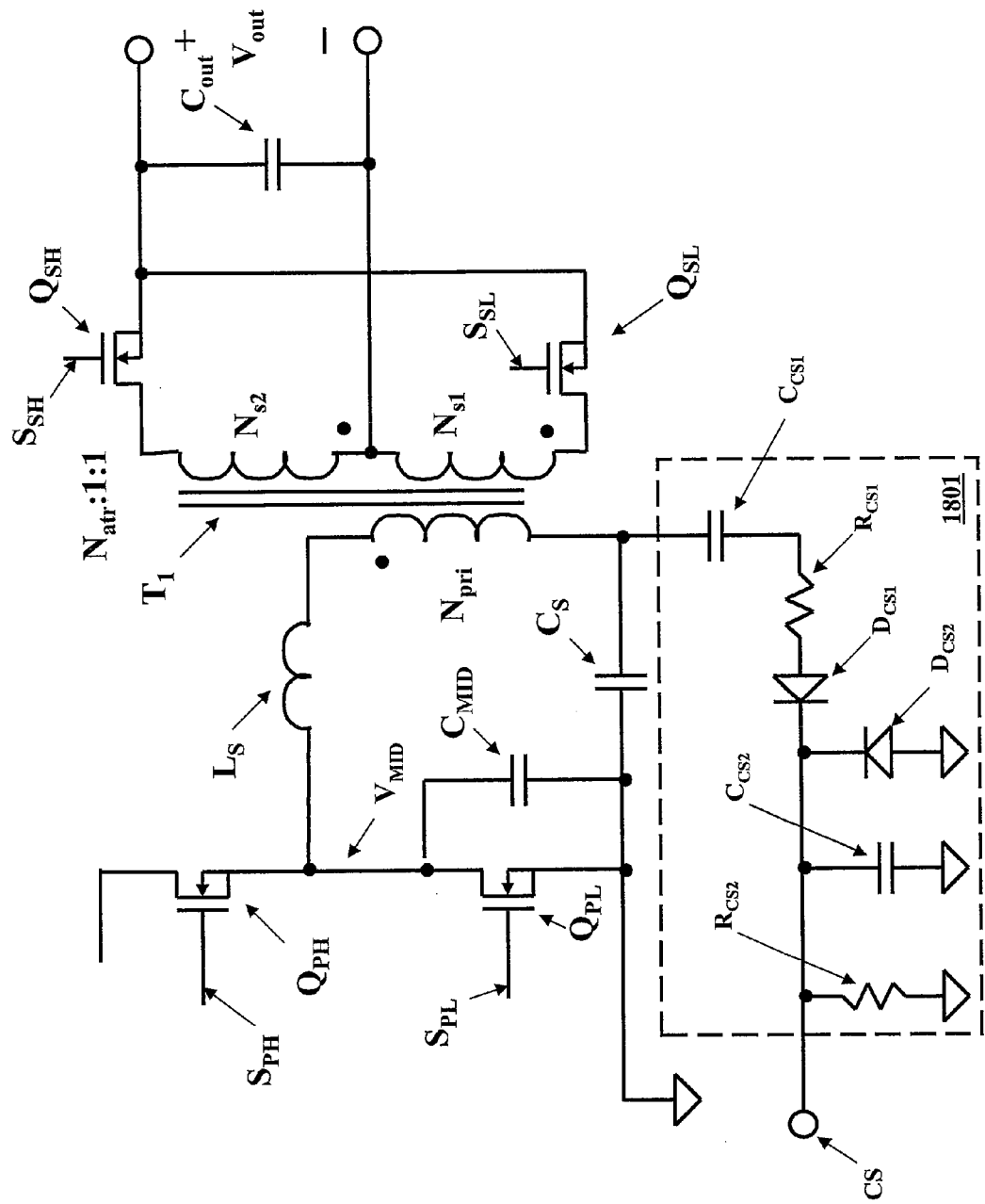
FIG. 18 illustrates a schematic drawing of a portion of a power converter formed with an LLC power train circuit topology, constructed according to the principles of the invention.

Turning now to FIG. 18, illustrated is a schematic drawing of a portion of a power converter formed with an LLC power train circuit topology, constructed according to the principles of the present invention. The components illustrated in the upper portion of FIG. 18 are reproduced from components illustrated in FIG. 1, and will not be further described in the interest of brevity. FIG. 18 illustrates current-sense circuit 1801 that senses a voltage across the LLC power-train capacitor $C_S$. The current-sense circuit 1801 is formed with capacitors $C_{CS1}$ $C_{CS2}$, resistors $R_{CS1}$ and $R_{CS2}$, and diodes $D_{CS1}$ and $D_{CS2}$. The output of current-sense circuit 1801 is coupled to the current-sense pin CS to provide an indication of load current of the power converter.

A pin vcsdc and another pin multi are thus employed to set a maximum on time for a secondary-side synchronous rectifier that depends on a load current.

The concept has thus been introduced of forming an LLC power converter with a controller configured to regulate an output characteristic of the power converter by controlling a switching frequency of the power converter to be higher than a resonant frequency thereof. The LLC power converter includes a primary-side power switch, a secondary-side power switch, a power transformer including a first winding coupled to a switched terminal of the primary-side power switch, and a second winding coupled to a switched terminal of the secondary-side power switch, a capacitor coupled between the switched terminal of the primary-side power switch and a terminal of the first winding of the power transformer. In an embodiment, the controller produces a first control signal to control the primary-side power switch and a second control signal to control the secondary-side power switch. In an embodiment, the controller produces a control signal to control the primary-side power switches and control signals to control the secondary-side power switches. In an embodiment, the secondary-side power switch is turned off earlier than a turn-off time of the primary-side power switch by a time difference that is controlled by a resistor coupled to an external circuit node. In an embodiment, the external circuit node is coupled to a current mirror and a regulated voltage source. In an embodiment, the controller is further configured to turn on the secondary-side power switch after a turn-on time of the primary-side power switch by a substantially constant time difference. In an embodiment, the controller controls a duty cycle of the primary-side power switch to be substantially 50%. In an embodiment, the power converter is formed as a half-bridge power train circuit topology. In an embodiment, secondary-side power switch performs him the function of a synchronous rectifier.

In a further embodiment, an LLC power converter is formed with a controller configured to regulate an output characteristic of the power converter by controlling a switching frequency of the power converter at a frequency lower than a resonant frequency thereof. The LLC power converter includes two primary-side power switches, two secondary-side power switch, a power transformer including a first winding coupled to switched terminals of the primary-side power switches and a second winding coupled to switched terminals of the secondary-side power switches, a capacitor coupled between the switched terminals of the primary-side power switches and a terminal of the first winding of the power transformer. In an embodiment, the secondary-side power switches are turned off earlier than corresponding turn-off times of the respective primary-side power switch by a time difference that is controlled by a resistor coupled to an external circuit node. In an embodiment, the controller is further configured to turn on the secondary-side power switches after the turn-on times of the respective primary-side power switch by a substantially constant time difference. In an embodiment, the controller controls a duty cycle of the primary-side power switches to be substantially 50%. In an embodiment, the power converter is formed as a half-bridge power train circuit topology. In an embodiment, the secondary-side power switches perform the function of a synchronous rectifier.

Another exemplary embodiment provides a method of controlling an LLC power converter with a switching frequency of the power converter higher than a resonant frequency thereof. In an embodiment, the method includes switching a terminal of a primary winding of a power transformer to an input voltage source with a primary-side power switch, rectifying a voltage produced at a terminal of a secondary winding of the power transformer with an active secondary-side power switch, providing dc isolation for the primary winding of the power transformer from the input voltage source with a capacitor, regulating an output characteristic of the power converter by selectively switching the primary-side power switch at a switching frequency higher than a resonant frequency of the power converter, and turning off the secondary-side power switch at a time that is earlier than a turn-off time of the primary-side power switch by a time difference that is controlled by a resistor coupled to an external circuit node. In an embodiment, the method further includes producing a current through the resistor inversely proportional to a resistance of resistor to produce the time difference. In an embodiment, the method further includes forming the power converter power converter with an inductor-inductor-capacitor power-train topology.

In a further embodiment, an LLC power converter is formed with a controller configured to regulate an output characteristic of the power converter by controlling a switching frequency of the power converter at a frequency lower than a resonant frequency thereof. The LLC power converter includes a primary-side power switch, a secondary-side power switch, a power transformer including a first winding coupled to a switched terminal of the primary-side power switch and a second winding coupled to a switched terminal of the secondary-side power switch, a capacitor coupled between the switched terminal of the primary-side power switch and a terminal of the first winding of the power transformer. The controller produces a first control signal to control the primary-side power switch and a second control signal to control the secondary-side power switch so that the secondary-side power switch is turned on at substantially the same time as the primary-side power switch, and is turned off after a maximum on time that is a nonlinear function of the load current of the power converter. In an embodiment, the nonlinear function is a substantially constant function of the load current for a value of the load current higher than a threshold value. In an embodiment, the controller senses a current in the first winding of the power transformer to sense the load current of the power converter. In an embodiment, the controller controls a duty cycle of the primary-side power switch to be substantially 50%. In an embodiment, the power converter is formed as a half-bridge power train circuit topology. In an embodiment, the secondary-side power switch performs the function of a synchronous rectifier.

In a further embodiment, an LLC power converter is formed with a controller configured to regulate an output characteristic of the power converter by controlling a switching frequency of the power converter at a frequency lower than a resonant frequency thereof. The LLC power converter includes two primary-side power switches, two secondary-side power switches, a power transformer including a first winding coupled to switched terminals of the primary-side power switches and a second winding coupled to switched terminals of the secondary-side power switches, a capacitor coupled between the switched terminal of the primary-side power switches and a terminal of the first winding of the power transformer. The controller produces control signals to control the primary-side power switches and further control signals to control the secondary-side power switches so that the secondary-side power switches are turned on at substantially the same time as the respective primary-side power switch, and are turned off after a maximum on time that is a nonlinear function of the load current of the power converter. In an embodiment, the nonlinear function is a substantially constant function of the load current for a value of the load current higher than a threshold value. In an embodiment, the controller senses a current in the first winding of the power transformer to sense the load current of the power converter. In an embodiment, the controller controls a duty cycle of the primary-side power switches to be substantially 50%. In an embodiment, the power converter is formed as a half-bridge power train circuit topology. In an embodiment, the secondary-side power switches perform the function of a synchronous rectifier.

Another exemplary embodiment provides a method of controlling an LLC power converter with a switching frequency of the power converter lower than a resonant frequency thereof. In an embodiment, the method includes switching a terminal of a primary winding of a power transformer to an input voltage source with a primary-side power switch, rectifying a voltage produced at a terminal of a secondary winding of the power transformer with an active secondary-side power switch, providing dc isolation for the primary winding of the power transformer from the input voltage source with a capacitor, regulating an output characteristic of the power converter by selectively switching the primary-side power switch at a switching frequency lower than a resonant frequency of the power converter, turning on the secondary-side power switch at substantially the same time as the primary-side power switch, and turning off the secondary-side power switch after a maximum on time that is a nonlinear function of the load current of the power converter. In an embodiment, the method further includes forming the nonlinear function as a substantially constant function of the load current for a value of the load current higher than a threshold value. In an embodiment, the method further includes forming the power converter with an inductor-inductor-capacitor power-train topology.

In a further embodiment, an LLC power converter is formed with a controller configured to regulate an output characteristic of the power converter by controlling a switching frequency of the power converter that may be higher or lower than the resonant frequency of the LLC power converter. In an embodiment, the controller is responsive to a signal to operate in the first operational mode or the second operational mode. The LLC power converter includes a primary-side power switch, a secondary-side power switch, a power transformer including a first winding coupled to a switched terminal of the primary-side power switch and a second winding coupled to a switched terminal of the secondary-side power switch, a capacitor coupled between the switched terminal of the primary-side power switch and a terminal of the first winding of the power transformer. In an embodiment, in a first operational mode the switching frequency of the power converter is above a resonant frequency of the LLC power train, and the turn-on time of the synchronous rectifier is shorter than the turn-on time of the primary-side power switch by a difference that is substantially constant. In a second operational mode the switching frequency of the power converter is below a resonant frequency of the LLC power train, and the turn-on time of the synchronous rectifier is produced as a nonlinear function of a load current of the power converter. In an embodiment, the nonlinear function is a substantially constant function of the load current for a value of the load current higher than a threshold value. In an embodiment, the controller controls a duty cycle of the primary-side power switch to be substantially 50%. In an embodiment, the secondary-side power switch performs the function of a synchronous rectifier.

In a further embodiment, an LLC power converter is formed with a controller configured to regulate an output characteristic of the power converter by controlling a switching frequency of the power converter that may be higher or lower than the resonant frequency of the LLC power converter. In an embodiment, the controller is responsive to a signal to operate in the first operational mode or the second operational mode. The LLC power converter includes two primary-side power switches, two secondary-side power switches, a power transformer including a first winding coupled to switched terminals of the primary-side power switches and a second winding coupled to switched terminals of the secondary-side power switches, a capacitor coupled between the switched terminals of the primary-side power switches and a terminal of the first winding of the power transformer. In an embodiment, in a first operational mode the switching frequency of the power converter is above a resonant frequency of the LLC power train, and the turn-on time of the synchronous rectifiers is shorter than the turn-on time of the respective primary-side power switch by a difference that is substantially constant. In a second operational mode the switching frequency of the power converter is below a resonant frequency of the LLC power train, and the turn-on time of the synchronous rectifier is produced as a nonlinear function of a load current of the power converter. In an embodiment, the nonlinear function is a substantially constant function of the load current for a value of the load current higher than a threshold value. In an embodiment, the controller controls a duty cycle of the primary-side power switches to be substantially 50%. In an embodiment, the secondary-side power switches perform the function of a synchronous rectifier.

Another exemplary embodiment provides a method of controlling an LLC power converter with a switching frequency of the power converter that may be higher or lower than a resonant frequency thereof. In an embodiment, the method includes switching a terminal of a primary winding of a power transformer to an input voltage source with a primary-side power switch, rectifying a voltage produced at a terminal of a secondary winding of the power transformer with an active secondary-side power switch, providing dc isolation for the primary winding of the power transformer from the input voltage source with a capacitor. In a first mode of operation the method includes regulating an output characteristic of the power converter by selectively switching the primary-side power switch at a switching frequency higher than a resonant frequency of the power converter, wherein a turn-on time of the synchronous rectifier is shorter than the turn-on time of the primary-side power switch by a difference that is substantially constant. In a second mode of operation the method includes selectively switching the primary-side power switch at a switching frequency lower than the resonant frequency of the power converter, wherein the turn-on time of the synchronous rectifier is produced as a nonlinear function of a load current of the power converter.

Although controller to produce a control signal for a secondary-side synchronous rectifier and related methods have been described for application to a resonant half-bridge power converter, it should be understood that other applications of such utilization, such as other power conversion topologies that may be applied in a power converter application, or in a power amplifier or in a motor controller application, are contemplated within the broad scope of the invention, and need not be limited to resonant half-bridge power converter applications.

Processes and related methods described herein to form a controller were described substantially employing analog and logic circuit components. It is contemplated within the broad scope of the present invention that these processes and related methods can be implemented using digital circuit techniques such as by employing a microcontroller or a digital signal processor.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power converter, comprising:
 a primary-side power switch;
 a secondary-side power switch;
 a power transformer including a first winding coupled to a switched terminal of the primary-side power switch and a second winding coupled to a switched terminal of the secondary-side power switch;
 a capacitor coupled between the switched terminal of the primary-side power switch and a terminal of the first winding of the power transformer; and
 a controller configured
  to regulate an output characteristic of the power converter by controlling a switching frequency of the power converter higher than a resonant frequency thereof, and
  to produce a first control signal to control the primary-side power switch and a second control signal to control the secondary-side power switch, wherein the secondary-side power switch is turned off earlier than a turn-off time of the primary-side power switch by a time difference that is controlled by a resistor coupled to an external circuit node.

2. The power converter as claimed in claim 1, wherein the external circuit node is coupled to a current mirror and a regulated voltage source.

3. The power converter as claimed in claim 1, wherein the power converter is formed with an inductor-inductor-capacitor ("LLC") power-train topology.

4. The power converter as claimed in claim 1, wherein the controller is further configured to turn on the secondary-side power switch after a turn-on time of the primary-side power switch by a substantially constant time difference.

5. The power converter as claimed in claim 1, wherein the power converter comprises a half-bridge power train circuit topology.

6. The power converter as claimed in claim 1, wherein the secondary-side power switch comprises a synchronous rectifier.

7. A power converter, comprising:
 a primary-side power switch;
 a secondary-side power switch;
 a power transformer including a first winding coupled to a switched terminal of the primary-side power switch and a second winding coupled to a switched terminal of the secondary-side power switch;
 a capacitor coupled between the switched terminal of the primary-side power switch and a terminal of the first winding of the power transformer; and
 a controller configured
  to regulate an output characteristic of the power converter by controlling a switching frequency of the power converter lower than a resonant frequency thereof, and
  to produce a first control signal to control the primary-side power switch and a second control signal to control the secondary-side power switch, wherein the secondary-side power switch is turned on at substantially the same time as the primary-side power switch, and is turned off after a maximum on time that is a nonlinear function of the load current of the power converter.

8. The power converter as claimed in claim 7, wherein the nonlinear function comprises a substantially constant function of the load current for a value of the load current higher than a threshold value.

9. The power converter as claimed in claim 7, wherein the power converter is formed with an LLC power-train topology.

10. The power converter as claimed in claim 7, wherein the controller senses a current in the first winding of the power transformer to sense the load current of the power converter.

11. The power converter as claimed in claim 7, wherein the power converter comprises a half-bridge power train circuit topology.

12. The power converter as claimed in claim 7, wherein the secondary-side power switch comprises a synchronous rectifier.

13. A power converter, comprising:
 a primary-side power switch;

a secondary-side power switch;
a power transformer including a first winding coupled to a switched terminal of the primary-side power switch and a second winding coupled to a switched terminal of the secondary-side power switch;
a capacitor coupled between the switched terminal of the primary-side power switch and a terminal of the first winding of the power transformer; and
a controller configured to regulate an output characteristic of the power converter by controlling a switching frequency of the power converter, wherein in a first operational mode the on time of the synchronous rectifier is shorter than the on time of the primary-side power switch by a difference that is substantially constant, and wherein in a second operational mode the on time of the synchronous rectifier is produced as a nonlinear function of a load current of the power converter.

14. The power converter as claimed in claim 13, wherein the controller is responsive to a signal to operate in the first operational mode or the second operational mode.

15. The power converter as claimed in claim 13, wherein the nonlinear function comprises a substantially constant function of the load current for a value of the load current higher than a threshold value.

16. The power converter as claimed in claim 13, wherein the power converter is formed with an LLC power-train.

17. The power converter as claimed in claim 16, wherein the first operational mode comprises a power-converter switching frequency higher than an LLC power-train resonant frequency.

18. The power converter as claimed in claim 16, wherein the second operational mode comprises a power-converter switching frequency lower than an LLC power-train resonant frequency.

19. A method of forming a power converter, the method comprising:
switching a terminal of a primary winding of a power transformer to an input voltage source with a primary-side power switch;
rectifying a voltage produced at a terminal of a secondary winding of the power transformer with an active secondary-side power switch;
providing dc isolation for the primary winding of the power transformer from the input voltage source with a capacitor;
regulating an output characteristic of the power converter by selectively switching the primary-side power switch at a switching frequency higher than a resonant frequency of the power converter; and
turning off the secondary-side power switch at a time that is earlier than a turn-off time of the primary-side power switch by a time difference that is controlled by a resistor coupled to an external circuit node.

20. The method as claimed in claim 19, further comprising producing a current through the resistor inversely proportional to a resistance of resistor to produce the time difference.

21. The method as claimed in claim 19, further comprising forming the power converter power converter with an inductor-inductor-capacitor power-train topology.

22. A method of forming a power converter, the method comprising:
switching a terminal of a primary winding of a power transformer to an input voltage source with a primary-side power switch;
rectifying a voltage produced at a terminal of a secondary winding of the power transformer with an active secondary-side power switch;
providing dc isolation for the primary winding of the power transformer from the input voltage source with a capacitor;
regulating an output characteristic of the power converter by selectively switching the primary-side power switch at a switching frequency lower than a resonant frequency of the power converter;
turning on the secondary-side power switch at substantially the same time as the primary-side power switch; and
turning off the secondary-side power switch after a maximum on time that is a nonlinear function of the load current of the power converter.

23. The method as claimed in claim 22, further comprising forming the nonlinear function as a substantially constant function of the load current for a value of the load current higher than a threshold value.

24. The method as claimed in claim 22, further comprising forming the power converter with an inductor-inductor-capacitor power-train topology.

25. A method of forming a power converter, the method comprising:
switching a terminal of a primary winding of a power transformer to an input voltage source with a primary-side power switch;
rectifying a voltage produced at a terminal of a secondary winding of the power transformer with an active secondary-side power switch;
providing dc isolation for the primary winding of the power transformer from the input voltage source with a capacitor; and
regulating an output characteristic of the power converter
in a first mode by selectively switching the primary-side power switch at a switching frequency higher than a resonant frequency of the power converter, wherein a turn-on time of the synchronous rectifier is shorter than the turn-on time of the primary-side power switch by a difference that is substantially constant, and
in a second mode by selectively switching the primary-side power switch at a switching frequency lower than the resonant frequency of the power converter, wherein the turn-on time of the synchronous rectifier is produced as a nonlinear function of a load current of the power converter.

* * * * *